Aug. 17, 1943.  W. R. FRENTZEL  2,326,775
CLEANER'S FORM FOR SIZING GARMENTS
Original Filed Dec. 10, 1938  15 Sheets-Sheet 1
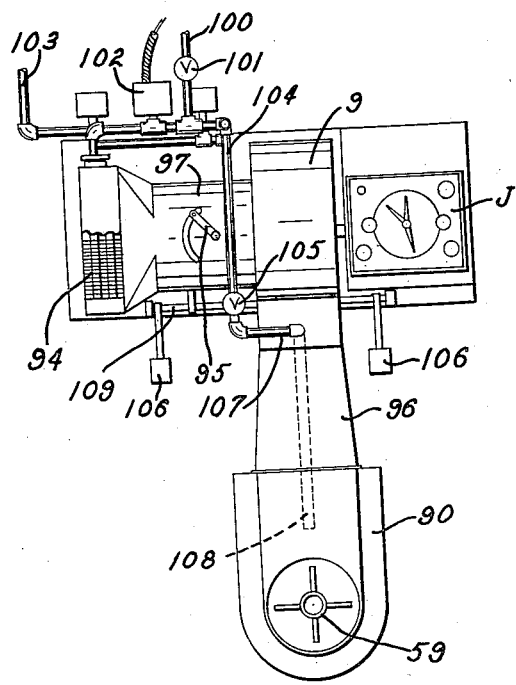
Fig. 2
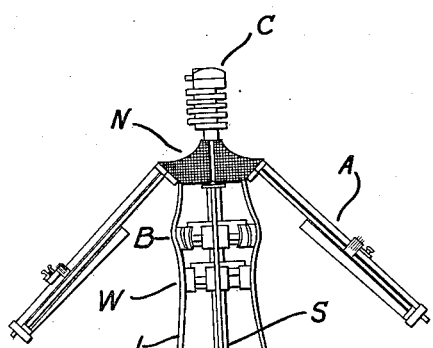
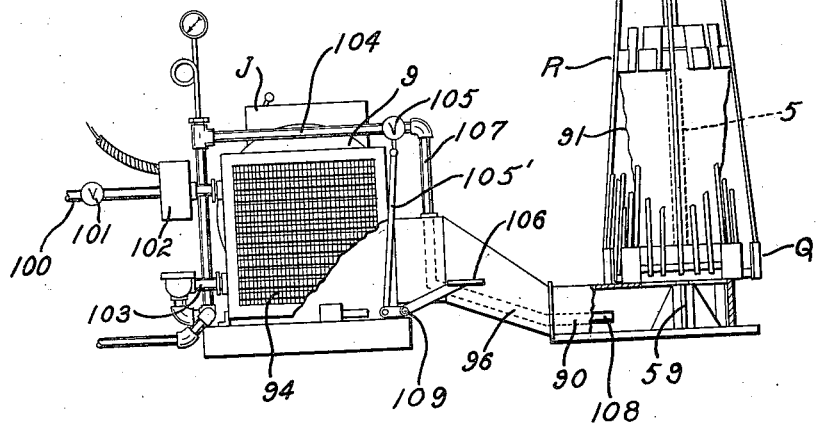
Fig. 1
Inventor
Wallmuth R. Frentzel
By Charles L. Reynolds
Attorney

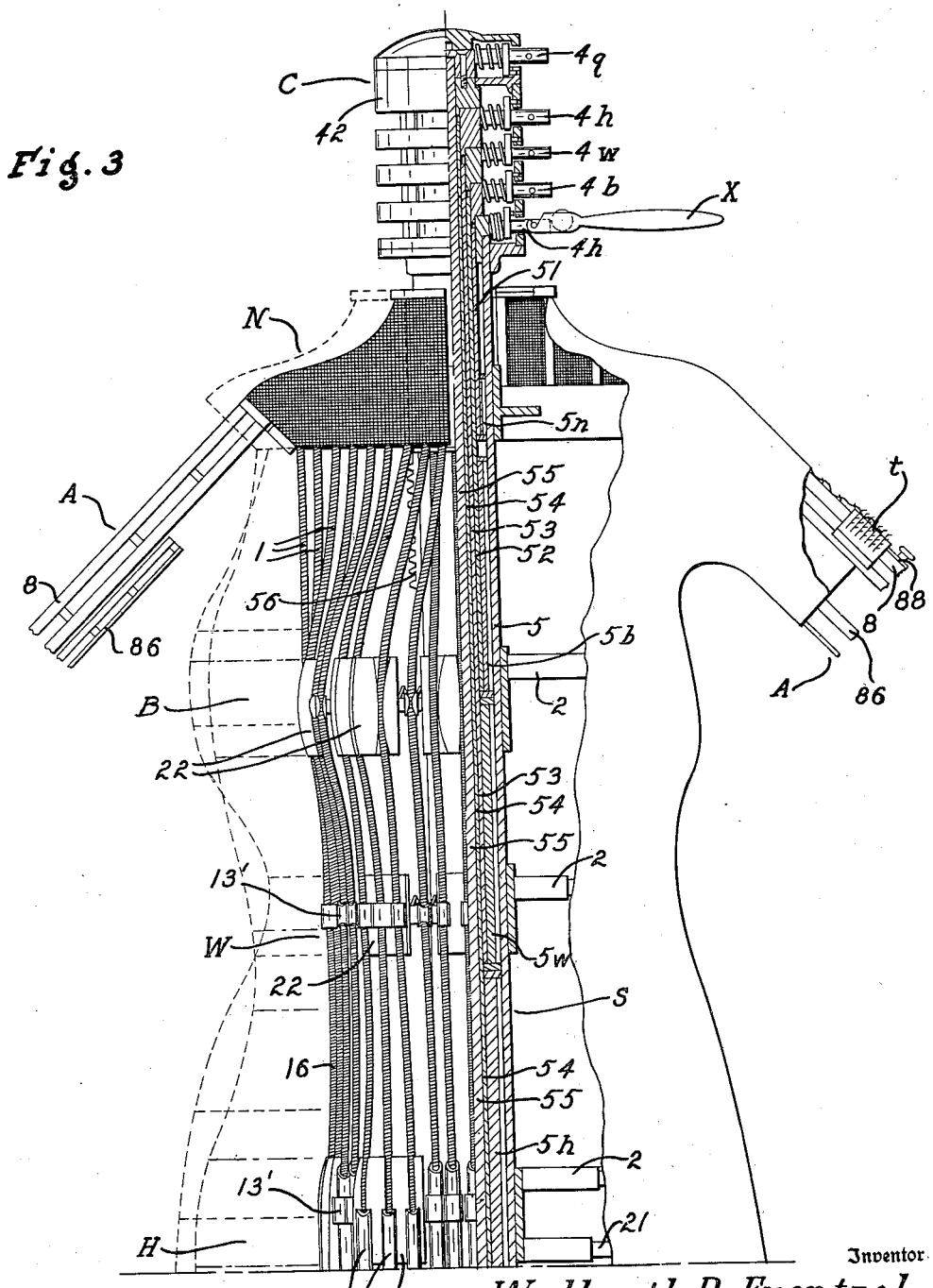

Aug. 17, 1943.  W. R. FRENTZEL  2,326,775
CLEANER'S FORM FOR SIZING GARMENTS
Original Filed Dec. 10, 1938   15 Sheets-Sheet 3

Inventor
Wallmuth R. Frentzel
By
Charles L. Reynolds
Attorney

Aug. 17, 1943.   W. R. FRENTZEL   2,326,775
CLEANER'S FORM FOR SIZING GARMENTS
Original Filed Dec. 10, 1938   15 Sheets—Sheet 4

Inventor
Wallmuth R. Frentzel
By
Charles L. Reynolds
Attorney

Aug. 17, 1943.     W. R. FRENTZEL     2,326,775
CLEANER'S FORM FOR SIZING GARMENTS
Original Filed Dec. 10, 1938    15 Sheets-Sheet 5
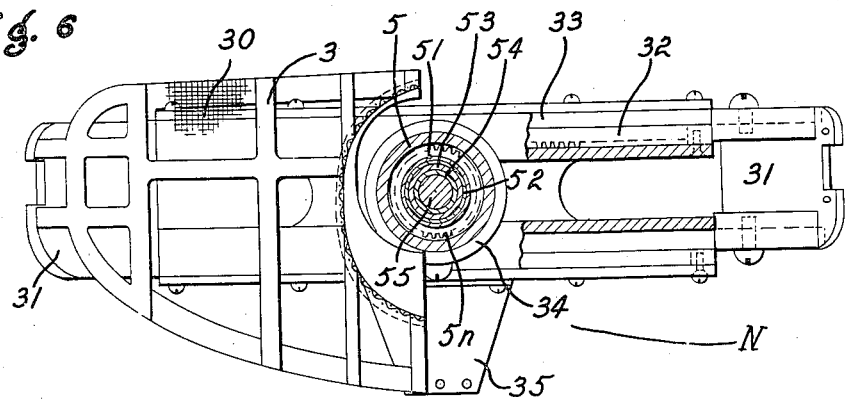
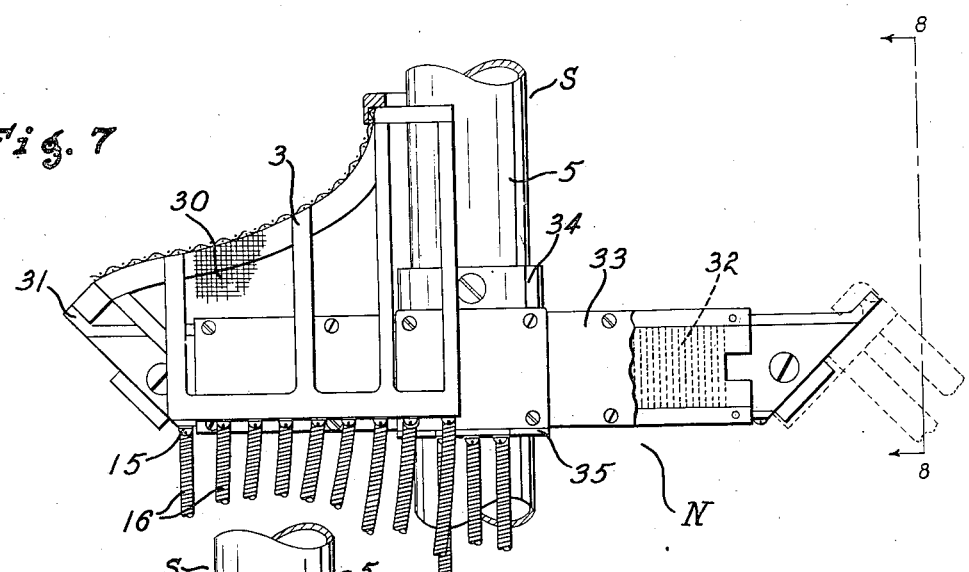
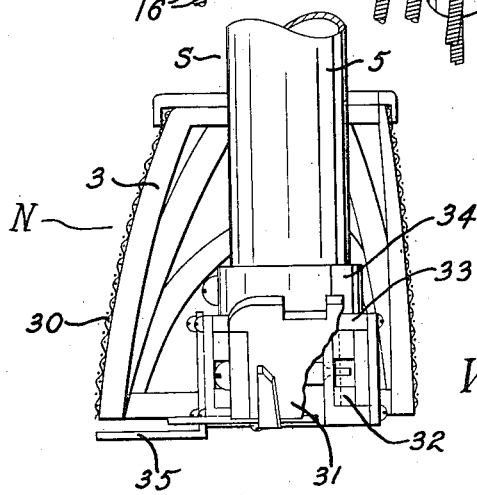
Inventor
Wallmuth R. Frentzel
By
Charles L. Reynolds
Attorney

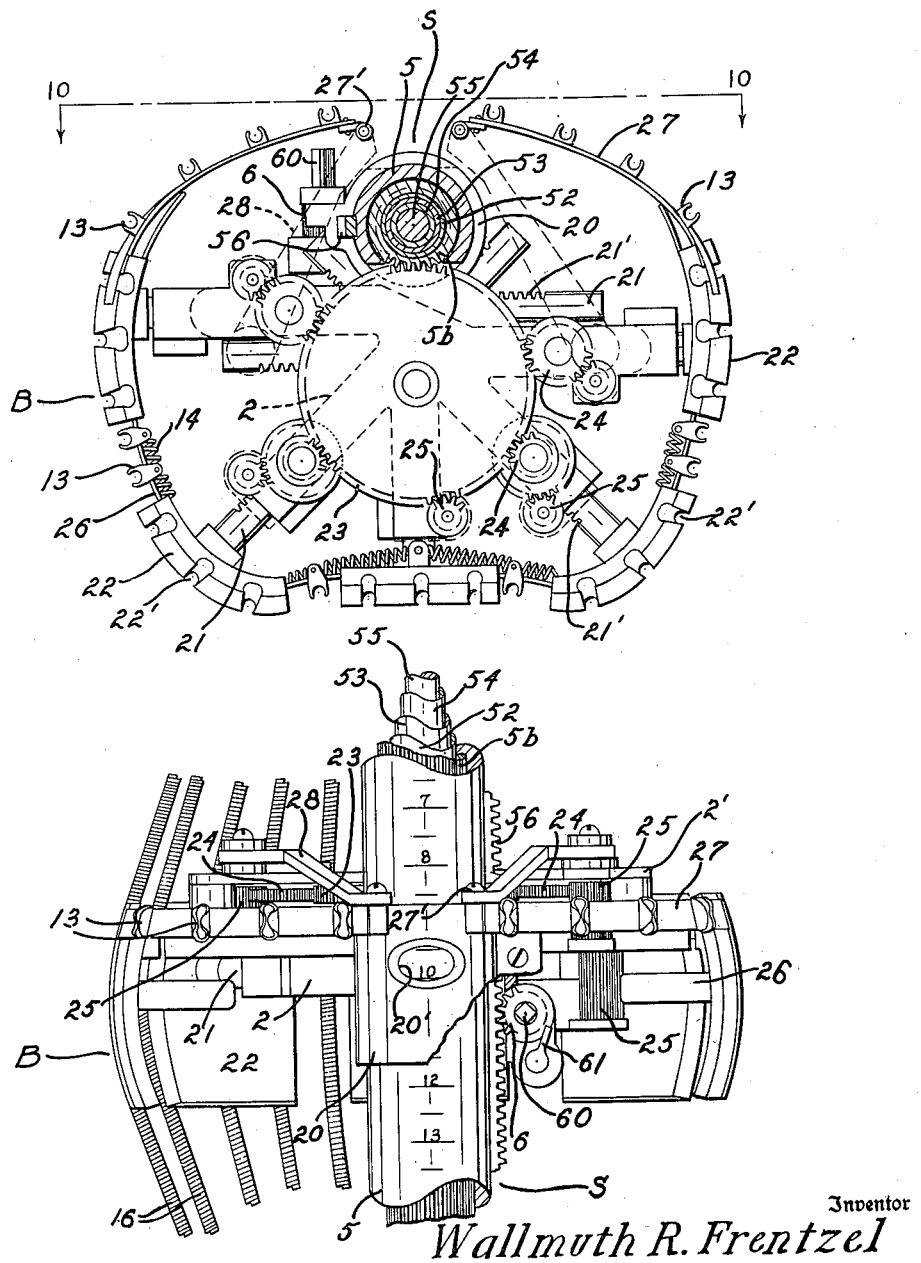

Aug. 17, 1943.  W. R. FRENTZEL  2,326,775
CLEANER'S FORM FOR SIZING GARMENTS
Original Filed Dec. 10, 1938   15 Sheets-Sheet 7

Inventor
Wallmuth R. Frentzel
By
Charles L. Reynolds
Attorney

Inventor
Wallmuth R. Frentzel
By Charles L. Reynolds
Attorney

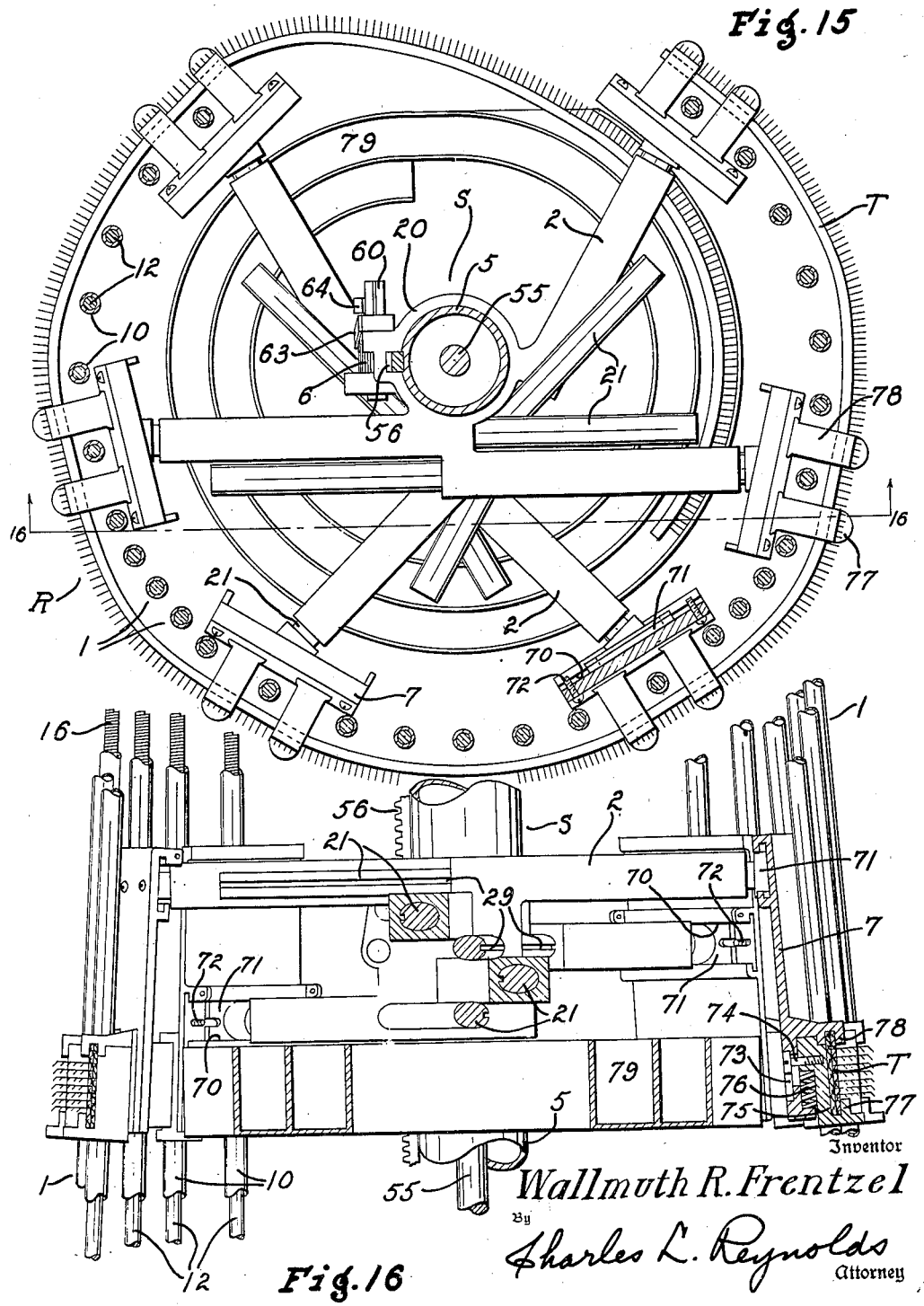

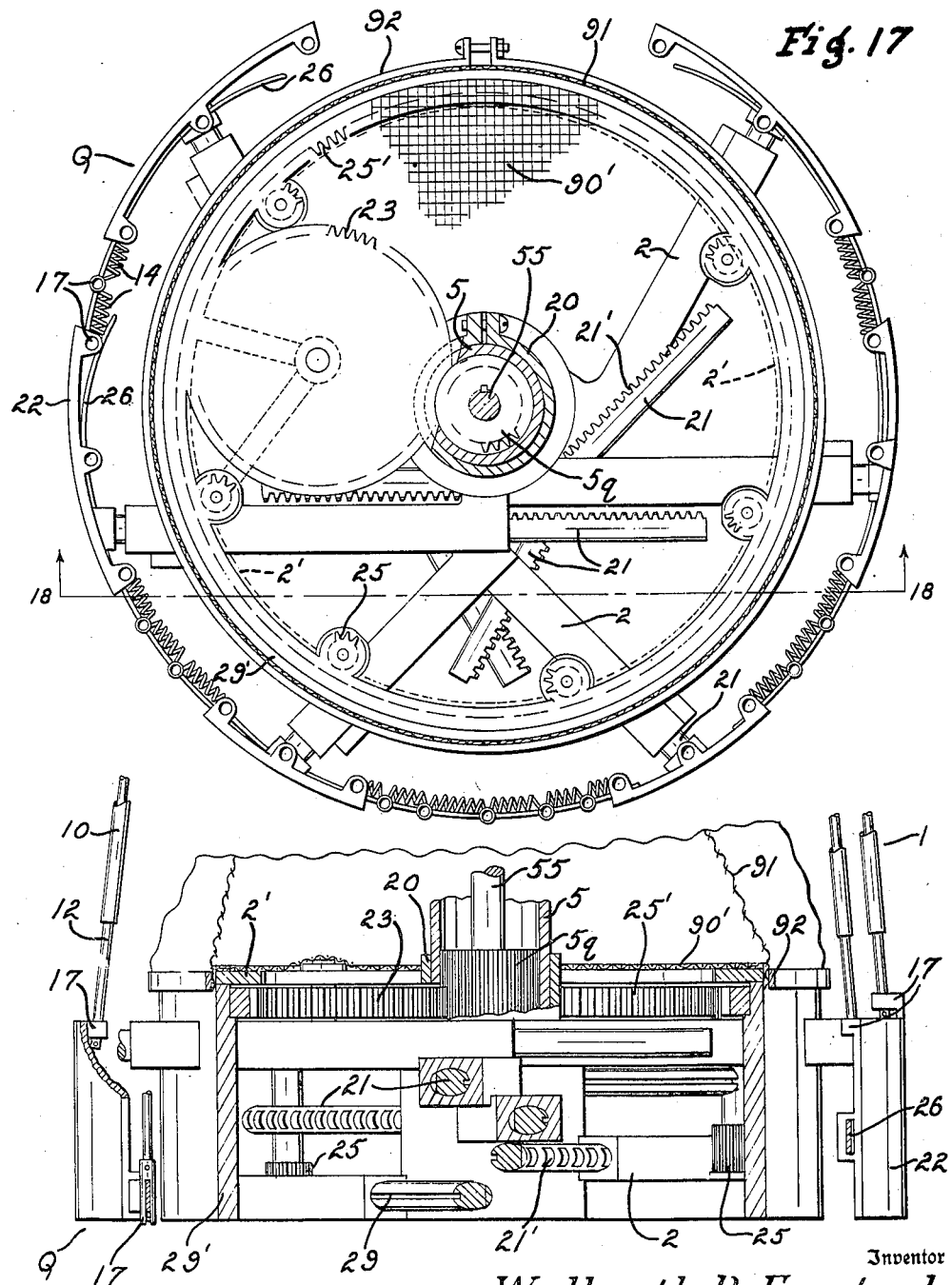

Aug. 17, 1943.  W. R. FRENTZEL  2,326,775
CLEANER'S FORM FOR SIZING GARMENTS
Original Filed Dec. 10, 1938    15 Sheets-Sheet 11
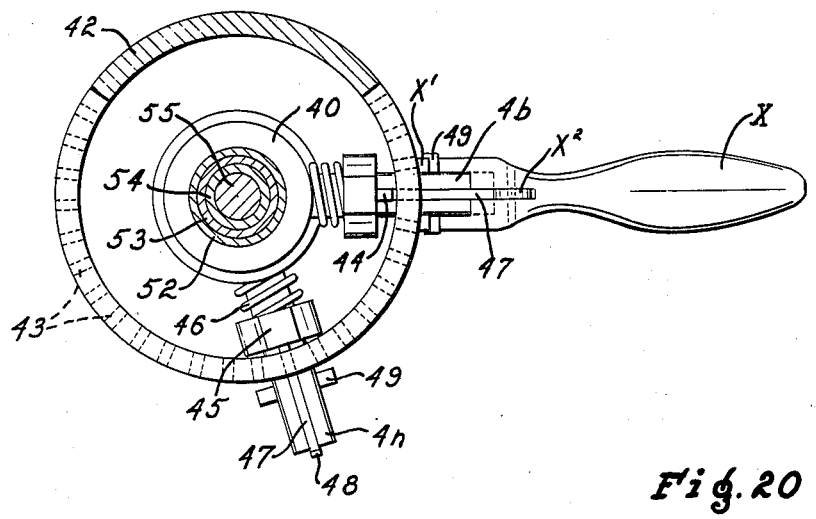
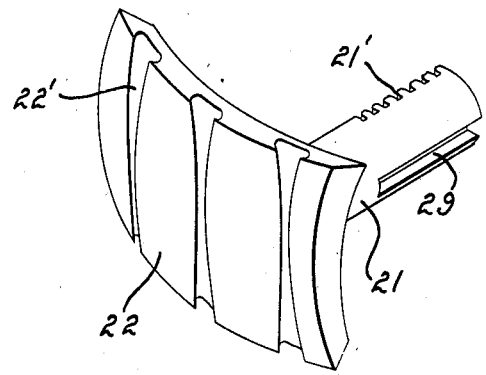
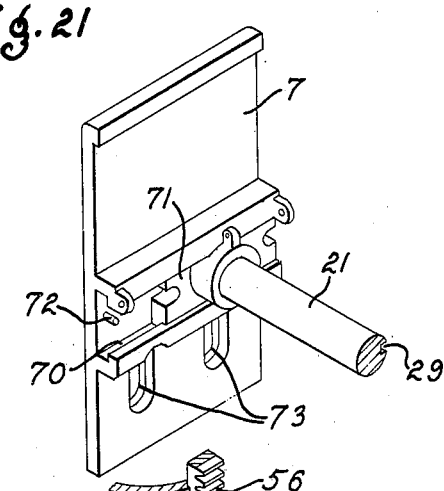
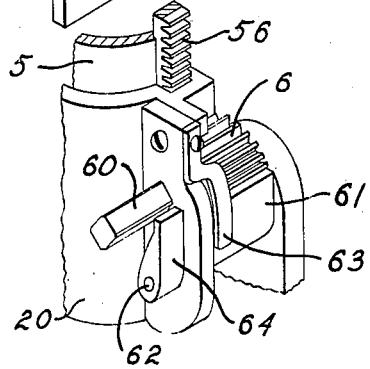
Inventor
Wallmuth R. Frentzel
By Charles L. Reynolds
Attorney

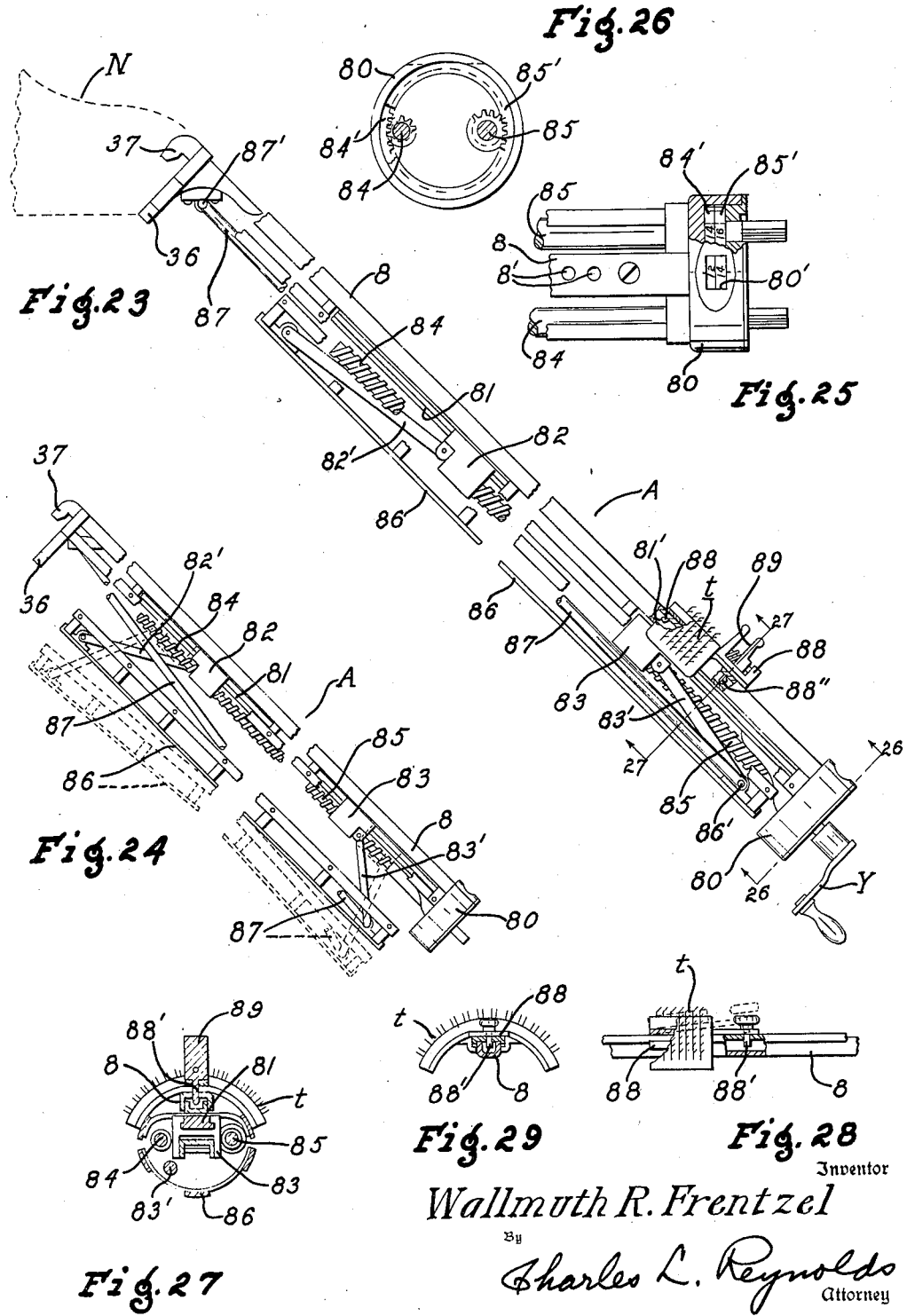

Aug. 17, 1943.        W. R. FRENTZEL                2,326,775
               CLEANER'S FORM FOR SIZING GARMENTS
          Original Filed Dec. 10, 1938    15 Sheets-Sheet 13

Inventor
Wallmuth R. Frentzel
By
Charles L. Reynolds
Attorney

Aug. 17, 1943. W. R. FRENTZEL 2,326,775
CLEANER'S FORM FOR SIZING GARMENTS
Original Filed Dec. 10, 1938 15 Sheets—Sheet 15

Inventor
Wallmuth R. Frentzel
By
Charles L. Reynolds
Attorney

Patented Aug. 17, 1943

2,326,775

UNITED STATES PATENT OFFICE 2,326,775

CLEANER'S FORM FOR SIZING GARMENTS

Wallmuth R. Frentzel, Seattle, Wash., assignor to University National Bank, Seattle, Wash., as trustee Substituted for abandoned application Serial No. 245,007, December 10, 1938. This application October 30, 1942, Serial No. 463,903

33 Claims. (Cl. 223—70)

This invention relates to the cleaning of garments, and more particularly to the treatment thereof after cleaning, including the bringing of the garment to proper size and shape, hereafter termed "sizing." The present application discloses improvements upon the apparatus and method disclosed in my Patent No. 2,189,789, issued February 13, 1940, the application for which was copending with the present application. This application is intended to be generic as to the common subject matter.

Problems involved

From no source do more controversies arise to plague cleaners of garments than from the question of the proper size and shape of the garment when returned to the wearer from the cleaners. Even when the garments are made of long used and simple fabrics and weaves, as cotton, wool, or silk, it is difficult for the cleaner to be sure that the garment, when returned to the customer, is of precisely the same shape and size that it was when he received it, for cleaning operations involve dipping the garment in a liquid, in some instances outright washing in water, but regardless of the nature of the liquid, even such simple fabrics are differently affected, and may be caused to shrink, or even in some instances to stretch.

With the advent of new materials, as rayon or acetate, and with the advent of mixtures, such as silk and rayon, the cleaner's problem is manyfold increased. The desirability for the initial discharge of ambient or cool air into the form is because, in the cleaning of dyed fabrics in particular, there is a tendency of the dye to run after the garment has been removed from the cleaning liquid or solvent and just prior to passing from a moist to a dry state. During the cleaning operation; that is, while the garment is in contact with the cleaning liquid, the dye is held fast by reason of the use of certain chemicals or special liquids mixed with the cleaning liquid. However, the effects of these liquids to retain the dye against running, is lost just prior to the garment becoming dry, but the dye can be set so that it will not run by the application of cool air to the garment. This cool air needs to be applied only for a relatively short period, and then the warm air is applied to complete the drying. Cleaning conditions, such as fluids used, temperatures, and the like, which may be suitable for one of the materials of the mixture is unsuitable for another material which may be incorporated within the mixture. Conditions which may be suitable for silk are unsuitable for rayon. Such problems are also complicated by variations in weave and in pattern of the goods. Crepes, for instance, exhibit a tendency to stretch. Velvets or like pile fabrics, are extremely difficult to handle, since, when finished, the pile must all stand up uniformly or highlights result. Velvet dresses are generally cut on the bias, and upon cleaning, wrinkling results at the seams, because of the drag of one piece upon another, and this is difficult to avoid, but makes the cleaning of velvet dresses difficult and expensive, simply because the cut of the fabric and the pile is difficult to handle.

Whereas such difficulties occur with comparatively simple woven fabrics, it will readily be understood that, great as they are, they are still further increased by knit fabrics of different materials, of mixtures, of different stitches, and of different patterns, especially when it is remembered that knit goods are generally loose and the loosely stitched knit garments have a tendency to stretch when wet, while other knit garments may shrink.

A great deal of thought has been given to such matters since the new fabrics and materials have come into widespread use, and since living and economic conditions do not ordinarily call for nor permit the cleaning of garments at home. While there were, at the turn of the century and prior thereto, dress forms available, some of which were adjustable to a greater or less degree, such dress forms are not suitable for cleaners' use to size a dress, for various reasons. For one reason, they are unsuitable because most of them are either solid or formed with solid surfaces, the contact of which with the dress is undesirable, and which with the dress in contact with them would not permit nor facilitate the drying of the dress, yet because of the nature of their construction, they must be solid or nearly so. For another and perhaps more important reason, such dress forms were originally selected to conform generally to one user only, and were intended to be adjusted, if at all, merely to conform to the shape of their owner, and once adjusted, were not normally changed in adjustment. It was therefore quite unimportant if the adjustments were a lengthy and laborious task, for it need be done only once. However, the dresses sent to a cleaner come from women of widely varying shape and size, and a cleaner's garment sizing form, to be practicable, must be adjustable quickly, easily, and with certainty to all the varying measurements, shapes and sizes comprehended within the almost infinite range of human size and shape variations; otherwise it is not economically practical.

Therefore, in attempting to provide means whereby garment scould be returned to their original size, cleaners provided themselves with tables whereon in one way or another measurements were taken of the dress before cleaning, and whereon the dress was applied and measured or stretched back to size after cleaning, with the dress in each instance laid flat upon the table. As variations of this, flat inserted stretchers were devised by which the dress could be stretched flatwise to an approximation of its original shape and size.

Such devices are subject to numerous and serious drawbacks—all stretch is applied at one point or along one line, rather than uniformly over the dress as a whole, with the result that it may be stretched unduly in one area and insufficiently in another area. As a corollary, the stretching being flatwise only, it is by such means impossible to shape the garment, for instance to fit snugly about the hips, waist, and bust without pulling it out of shape at other points. Furthermore, such devices are merely stretchers or sizing charts and tables, and the garment must be dried after cleaning by some other arrangement, with the result that it must be brought back to size by a fit and try method, being dried and then stretched or stretched and then dried, and then if it is not of the proper shape or size perhaps it must be wet and dried all over again, and stretched again. The garment cannot be dried while carried upon such a flat stretcher form, and if it were, while it might conform in width, it does not conform in shape to the human form, for it is flat, while the human form bulges, at the busts and hips, for instance. Still a further difficulty is that some garments or materials stretch when cleaned, and therefore they must be processed additionally to shrink them, in order that they may be again stretched to the proper size, and this shrinking and subsequent stretching are separate operations, and there is no way of controlling them adequately or relatively.

Objects of the invention

These and similar problems have faced cleaners for a number of years past, and the solutions heretofore proposed have been largely makeshifts. It is, then, a prime object of the present invention to provide a form for the use of cleaners whereby they may with expedition, exactness and accuracy, without likelihood or even the possibility of damage to the garment, and with one setting of or operation upon each garment, insure that it will be returned to its original size and shape, not one alone but both, at the completion of the operation, and regardless of whether or not in returning it to this original size and shape it must be stretched or shrunk, and, moreover, to accomplish this end in a form which is quickly and readily adjustable in all necessary ways to conform to the size and shape of the wearer of the garments, not to any fictitious "average human figure," and by a form which permits finishing the garment while it is so held in size and shape. This accomplishes the ultimate economic objects of providing for the cleaner's use a form which will eliminate complaints from improper sizing and treatment of the garments in cleaning, and a form which will accomplish these ends with a minimum of labor and expense.

It is a further object to provide for such purposes a device which is simple in its construction and rugged, easily operated by comparatively unskilled operators, and which is adapted to the needs of all types of materials and fabrics.

Since human sizes vary in different directions at different zones, vertically spaced (for instance at the bust size variations are generally forwardly and somewhat laterally, whereas at the hips the size variations are generally rearwardly and laterally); it is an object of the invention to provide expanding means for the form, and for each zone thereof in which are incorporated expanding means, that will automatically accomplish variation to the proper degree and in the proper direction for that zone.

Also, since human shapes vary in that certain of such zones of size variations are spaced nearer one another in one figure than in another, and since such variations may occur regardless of the height of the person, it is a further object to provide expanding means which can be adjusted in height relative to one another, and which in any such vertically adjusted position will function to accomplish the required expansion, in the manner indicated above.

Since a fluid medium, such as air or steam, is discharged within the garment to treat it, for instance to dry it, while it is upon the form, it is a detailed object of the invention to provide expanding means of such skeleton character as will to the smallest degree possible obstruct freedom of communication between all parts of the interior of the form, and passage of fluid through all parts of the garment.

In the handling of various special fabrics, velvet for instance, it is desirable to moisten the velvet, and since in the treatment of substantially all fabrics, it is desirable to employ air, sometimes cold air and sometimes hot air, and sometimes each in succession, it is an object of the invention to provide, in conjunction with an expansive and adjustable form, means to discharge fluid mediums, preferably of different characteristics, and to vary those characteristics, either by operator-controlled means or by automatic means, or both, to the end that there may be provided in a single device means which will operate properly upon a garment, whatever may be the material of which it is made.

Various other detailed objects will be discovered as this specification progresses, and it is deemed unnecessary at this point to go farther into these detailed objects.

Drawings

In the accompanying drawings I have shown my invention embodied in a form which is at present preferred by me. It will be understood, however, that this represents only one form of embodiment, and that the principles of my invention as herein disclosed and as hereafter defined by the claims may be embodied in various forms without departure from the spirit of the invention as thus defined. My invention, therefore, comprises the novel parts, and the novel combination and arrangement thereof, and also the novel method, shown and disclosed in the accompanying drawings and specification, and as more particularly defined in the claims.

Fig. 1 is a general elevation of the machine as a whole, certain parts being broken away or omitted for clearer illustration, and Fig. 2 is a general plan view of the same, with the form itself, however, omitted.

Fig. 3 is in part an elevation and in part a section of the form from the hips upward, illustrating in dash lines some of the possibilities for adjustment.

Fig. 6 is in part a plan view and in part a section of the shoulder form which I prefer to employ, Fig. 7 is a similar view in elevation, and Fig. 8 is a similar view in elevation taken at right angles to Fig. 7, from the viewpoint illustrated by the line 8—8 in the latter figure.

Fig. 9 is a plan view of the bust expander, and Fig. 10 is an elevation of the same, with parts omitted, from the viewpoint shown by the line 10—10 of Fig. 9.

Fig. 15 is a view similar to Fig. 11, and Fig. 16 is a view similar to Fig. 12, on the line 16—16 of Fig. 15, these two views illustrating the hem holder.

Fig. 17 is a view similar to Fig. 11, and Fig. 18 is a view similar to Fig. 12, on the line 18—18 of Fig. 17, these two views illustrating the lowermost or hold-down ring or hoop.

Fig. 19 is a transverse section through the control head, substantially on the line 19—19 of Fig. 5, illustrating an operating wrench in engagement with one of the control elements.

Fig. 20 is a perspective view of a convexly curved face plate of the general type employed at the bust and hips.

Fig. 21 is a perspective view of a detail of the hem holder.

Fig. 22 is a perspective view of a detail of the vertical adjustment control device.

Fig. 23 is a general elevation of the sleeve form, which may be used as an attachment to the garment form, showing parts in the collapsed position, and Fig. 24 is a similar view showing parts in an expanded position.

Fig. 25 is a detail, partly in plan view and partly in section, of the outer or control end of the sleeve form.

Fig. 26 and Fig. 27 are transverse sections on the respective lines 26—26 and 27—27 of Fig. 23.

Fig. 29 is a detail in end view or cross section of the cuff holder, and Fig. 28 is in part a side elevation and in part a section through the same.

The garment form as a whole

Figure 4:
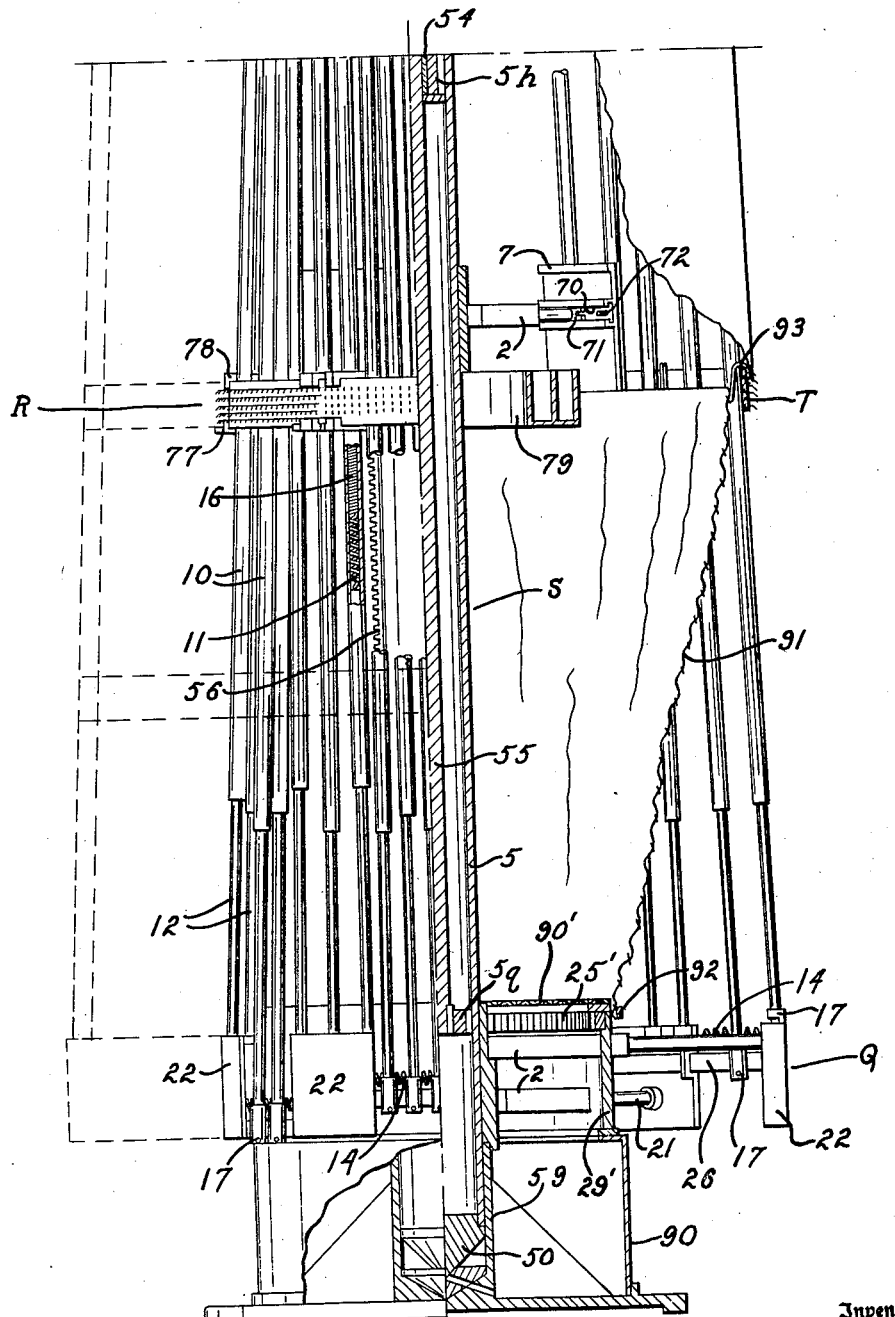
Fig. 4 is a view similar to Fig. 3, showing the form below the waist, and including its mount.

The form as a whole is made up of generally human shape. This does not mean that it must be formed with arms and legs, although it is not outside of the spirit of my invention to provide these if desirable, or to provide sleeve forms and trouser leg forms, and indeed the form has been shown as provided with a sleeve form, in the nature of an attachment for use when needed.

However, since the great majority of garments sent to cleaners are women's dresses or skirts, and since difficulties of sizing are met almost exclusively in women's garments, it will normally be found sufficient to make the form of generally human shape except as varied by defining the form of a skirt below the hips. Its interior and its skin or garment-engaging surface must be as nearly open and free of obstructions as possible, in order that air or like fluids blown into the bottom of the dress may pass freely into all parts of the garment and out through the fabric. To meet these requirements, and also in order that it may be freely adjustable in all necessary ways, the form may be conveniently formed of a neck or shoulder form N, a lowermost or hold-down ring or hoop Z, and longitudinal flexible and extensible elements extending between the two, hereafter termed generically longitudinals, the shoulder form N at least being supported by an upright support S, which may be in the form of a post or tube supported in a suitable base; preferably the hold-down ring Q is also, in part at least, supported from the support S. The longitudinals 1, above referred to, and generically designated by the numeral 1, are conveniently, in large part or wholly, tight coils 16 of spring-like material and conformation, but without appreciable tendency, within each coil, to twist anchored at the shoulder form N and at lowermost ring Q. However, from the hips downwardly, that is to say in the portion which defines the major portion of the skirt, these coils 16 may be received within enclosing tubes 10, within which they are joined by light springs 11 to rods 12, which are anchored at 17 to the lowermost ring Q. These longitudinal elements vary widely in length, from the minimum or collapsed position to the largest size. To avoid stretching the coils 16 themselves, and to avoid pinching of the dress fabric by relaxing extended coils 16, the light enclosed springs 11 are used. All extension is accomplished by stretching these springs 11, instead of the coils 16, and the capacity for expansion of the springs 11 is sufficient to permit the complete range of adjustment, and to insure return of the form to its minimum size.

Intermediate the shoulder form N and the hold-down ring Q are the bust, waist and hip expanders, designated B, W and H, respectively, and since the form from shoulder piece N to the hold-down ring Q is usually of greater height than the distance from the shoulder of a woman to the floor, and it is necessary to hold down the hem of the skirt, a hem holder R is positioned between the hip expander H and the hold-down ring Q. Each of these elements B, W, H and R is supported from the support S, or in any event otherwise than from the longitudinals 1.

Each of these expanders B, W and H, the hold-down ring Q, and the shoulder form N if the latter is to be expandible as it is herein shown, is separately expansible or contractible under the influence of its individual adjusting elements constituting part of a distance control head C, which is herein shown as mounted at the upper end of the support X, and which communicates with the individual expanders through the support. The expanders in their detracted or collapsed position are preferably of appreciably less size than the smallest human size, for convenience in applying the garment upon the form or removing it therefrom, and convenience of handling the garment is facilitated by reason of the fact that the control head C is wholly external of the form, so that a garment may be applied upon the form and then expanded to the proper size through operation of the parts of the control head C, thereby expanding the individual expanders to the proper size desired.

It may be desirable, and is entirely practicable, to alter the structure of the control head, and to locate the actual control head elsewhere than upon the support S, even distant from the form itself, connecting it to the expanders by any convenient type of distant operating or transmitting means, such as would readily suggest themselves for such a purpose.

Certain of the expanders are also adjustable vertically, and since each of them is mounted upon the support S, the adjustment is with relation to the latter as a guide. Each such expander is thus vertically adjustable independently of all the others, so that the spacing of any such expander relative to any other expander can be adjusted. The hem holder R is likewise adjustable vertically, and preferably it is manually adjustable radially, since the hem of the skirt must be manually engaged therewith, though it might be expansible conjointly with the hip expander, and by the same control means.

The arm or sleeve forms A reformed as attachments which may be engaged at will with or disengaged from the shoulder form N.

*The expanders*

In principle the expanders are all alike, and to a large degree a description of one will suffice for the others. Each is supported from the tubular support or "backbone" S. A description of the bust expander B, shown in detail in Figs. 9 and 10, will serve to make clear the principle of operation of these expanders.

A local support 2, in the nature of a spider, so that it impedes to the least degree the dissemination of a fluid medium throughout the form, is supported from the support S by an encircling sleeve 20. This spider forms a plurality of generally radial guides, wherein are slidable rods 21. Each rod bears upon its outer end a face plate 22. Means are provided for moving these face plates, with and by means of their rods, simultaneously outwardly or inwardly, but in most of the expanders by different amounts in different directions, and in the several different expanders differently in amount in a corresponding direction than in other expanders. In the bust expander, shown in Figs. 9 and 10, the movement is primarily forwardly and somewhat outwardly, and to a lesser degree directly sidewise, with no expansion rearwardly.

Since some such expanders, in moving outwardly, and others, in being held inwardly, operate against the resistance of the flexible longitudinals 1 with which the face plates engage, considerable force may be required to move the expanders outwardly and to hold them in outwardly expanded position, or to restrain an inwardly held expander, and this may be accomplished by positive means such as the gears illustrated best in Fig. 9, for the bust expander. The locking in a given position is accomplished preferably in the control head, as later described. A master gear 23 is rotated by mechanism which will be described hereafter in conjunction with the support S and the control device C, and it in turn meshes with intermediate gears 24, and these in turn with the final gears 25, or, in some instances, the master gear 23 may mesh directly with a final gear 25. Each gear 25 in turn meshes with rack teeth 21' formed on the individual rods 21. Hence by rotation of the master gear 23, the rods 21 and their face plates 22 are moved inwardly or outwardly. By proper choice of the size and characteristics of the intermediate gears 24 and the final gears 25, and by proper choice of the size of the master gear, the desired ratio of movement of each of the face plates relative to the others is readily obtained, yet the entire arrangement is compact, strong and simple, parts can be readily replaced if necessary, and sufficient free space is left for proper dissemination of a fluid medium throughout the entire interior of the form. Each gear is suitably journaled upon its spider, of which an upper bearing plate 2' constitutes a part.

Since the expansion between minimum and maximum positions of adjustment may effect considerable separation of the edges of adjoining face plates 22, it is preferred that one or more of the longitudinal flexible elements 1 be disposed between such face plates, and in order that they may not fail to move outwardly with the expanders, though not directly engaged by the face plates, it is desirable that such intermediate longitudinals 1 be supported in effect from the adjoining face plates, and to that end I provide flexible bands 26, which extend between or through the face plates, supported from the latter, and supporting the longitudinals 1 by suitable clips 13. These coils 16 which are disposed in the path of movement of such face plates as are exteriorly convex (see Fig. 20), being parts of the bust expander and the hip expander in particular, are received in grooves, as indicated at 22', so that they lie flush with the face of the face plate. This prevents the formation of ridges upon the outwardly pressed surface of the dress, for the dress at such points lies substantially flat on the face plates. To hold the longitudinals 1 in relatively spaced position these elements, of the clips 13 which hold them, are connected with each other and with the face plates, at such points as are necessary, by light springs 14, the strength or tension of which is so adjusted or selected as to hold the longitudinals 1 approximately equally spaced, whatever may be the adjustment of the expander.

Since the bust expander does not expand rearwardly, the rear portion of this expander may be formed by a flexible element 27, similar to but preferably separate from the element 26, the rear end of which may be anchored at 27' behind and adjacent the support S by a suitable bracket 28 supported from the spider 2.

The remaining expanders W, H and Q are similarly operable, and the same numerals are applied to the similar parts of these expanders. However, it will be noted in conjunction with the waist expander W that the coils 16 are not received in grooves in the face plates, like the grooves 22', but are entirely retained and held inwardly drawn by clips 13', similar to the clips 13, for it will be remembered that the force of the longitudinal elements, due to the greater outward projection of the bust expander B above and the hip expander H below the waist expander, is to straighten the coils 16, and the waist expander must therefore hold these drawn in toward the waist, and there is no likelihood of defining ridges in the dress at the waist, since there is no outwardly convex surface at the waist upon which the dress lies while upon the form.

Figure 13:
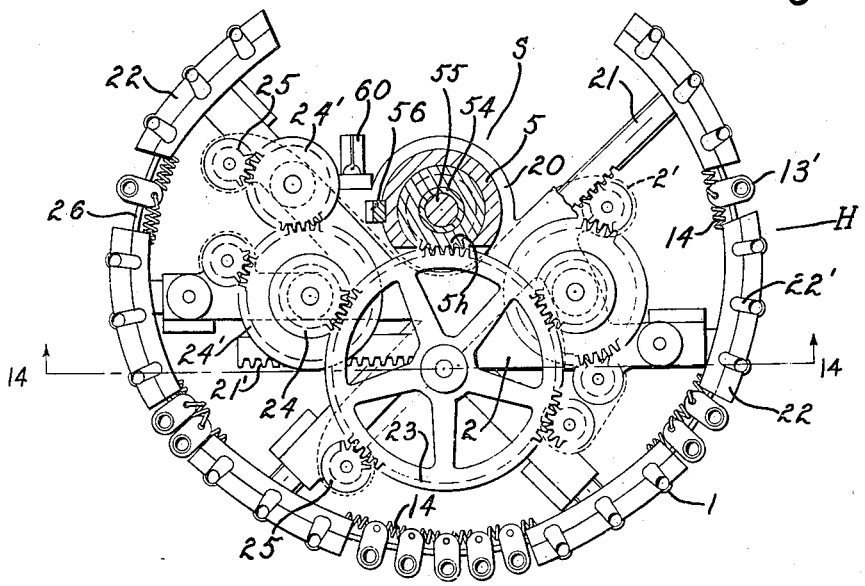
Fig. 13 is a view similar to Fig. 11.
Figure 14:
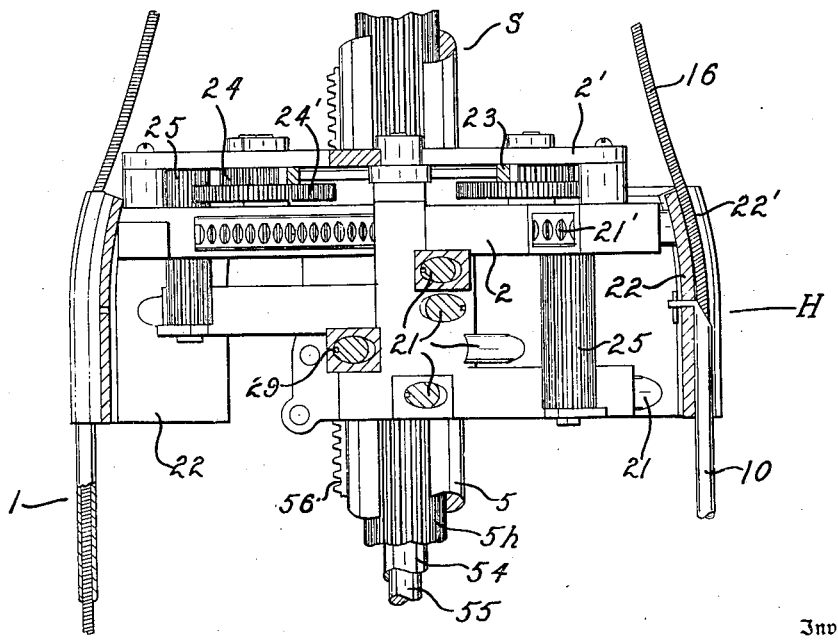
Fig. 14 is a view similar to Fig. 12, on the line 14—14 of Fig. 13, these two views illustrating the hip expander.

It will be noted that the gearing arrangement of each of these expanders B, W, H and Q is different, and different with relation to the same general directions in each instance. Thus at the waist the expansion is generally equal forwardly and laterally, and at the hips the expansion is greater rearwardly than forwardly or laterally, and the lateral expansion is greater than the forward expansion. There are such detail variations between the several active expanders, but their general principles are the same, and it is believed that a description of one will suffice for all the others. Indeed, in Fig. 13, instead of employing a single intermediate gear 24, two intermediate gears 24 and 24' are employed, for movement of certain of the face plates, yet this is merely to obtain the gear ratio necessary, and the principle is unchanged.

The shoulder form N, shown in Figs. 6, 7 and 8, might be non-expansive, but preferably it is expansive in somewhat the same manner as the expanders already described; but since the expansion at the shoulders is primarily only to accommodate variations in shoulder width, the shoulder expander, if made expansible, need be expansible only laterally to each side, and therefore may be more simply made and operated than the other expanders. This shoulder expander 3, generally formed in simulation of a human shoulder in the form shown, comprises two half-forms, separated along a back-to-front vertical plane, and over each of these half-forms is secured a mesh 30. At the points of the shoulders, plates 31 are provided for securement of the sleeve forms A, when the latter are to be used. Each such half of the shoulder form is carried upon a rack bar 32, guided for transverse movement in a frame or spider 33, which is secured in place upon the support S by the sleeve 34. Instead of employing a master gear and gearing, controllable from the control head C through the support S for adjustment of the shoulder form N, the rack teeth of the rack bars 32 are directly engageable by a gear forming part of the mechanism incorporated within the support, as will be explained later, and by operation of such mechanism the two halves of the shoulder form are caused to separate laterally or to draw inwardly.

The upper ends of the longitudinal elements 1 are secured, as indicated at 15, to the margins of the shoulder form 3. To cover the gap left by separation of the adjoining edges of the two halves of the shoulder form, some of the coils 16 may be connected to a bracket 35, supported from the spider 33, as best seen in Fig. 7.

The lowermost or hold-down ring Q, shown in Figs. 17 and 18, is likewise expansible. While it might be expansible under control of the same means which controls the expansion of the hip, preferably it is controlled independently of the other expanders. It need not have a different rate of expansion in different directions, and preferably expands uniformly in all directions, and to a greater diameter than the hip expander, since the hem of a skirt is usually fuller than the hips. The holddown ring is expansible by a master gear 23, as in the case of the bust, waist and hip expanders, but operating upon an intermediate internal ring gear 25', to drive the final gears 25, which may be all alike. The ring gear 25' is, like all other expander gears, supported upon the spider 2, upon a base ring 29', which in this instance is cast integral with and in effect constitutes a part of the spider 2. The purpose of using a ring gear is to obstruct to the least degree possible the entrance of air into the bottom of the form. This is feasible at this level since differential expansion in different directions is not necessary.

The lower ends of the longitudinal flexible elements 1 are anchored to the face plates 22 of the hold-down ring Q, or to the peripheral flexible elements 26, bridging the gap between the adjoining edges of face plates, as indicated at 17. As will be remembered, the lower ends of these longitudinal flexible elements are formed as rods 12, and it is these rods, rather than the lower ends of the coils 16 which are connected at 17.

In all these expanders, for convenience of manufacture, the rack bars 21 may be circular in cross section, and their guides within the spider may be of like section, but in order to prevent their rotation they are suitably keyed in place, as indicated by the keying grooves 29.

*Lateral expansion*

Lateral expansion in each of the active expanders is accomplished by rotation of the master gear located upon the local support or spider 2, or by rotation of an equivalent element located adjacent the expander, but within the support S. It is obvious that this rotation might be accomplished locally, that is to say, the master gear of each spider might be rotated by hand or by means located immediately adjacent the spider. This is not desirable, however, for the reason that the expansion is not ordinarily effected until the dress is in place upon the form, and the dress would therefore interfere with or prevent the expansion by such local means. Moreover, after the dress has been finished it cannot be conveniently removed from the form without collapsing the form, and again the dress would interfere with the collapsing of the form, and might be mussed in attempting to do so. It is, moreover, desirable to centralize all such lateral expansion control devices at one place, and this place should conveniently be outside the dress when it is in place upon the form. Such controls have therefore been centralized in the control head C, and the parts of the latter are connected through the support S to the individual gears which mesh with the individual master gears 23. The particular form, location, and manner of connection of the control head may, however, depart from that shown, as indicated heretofore.

Figure 5:
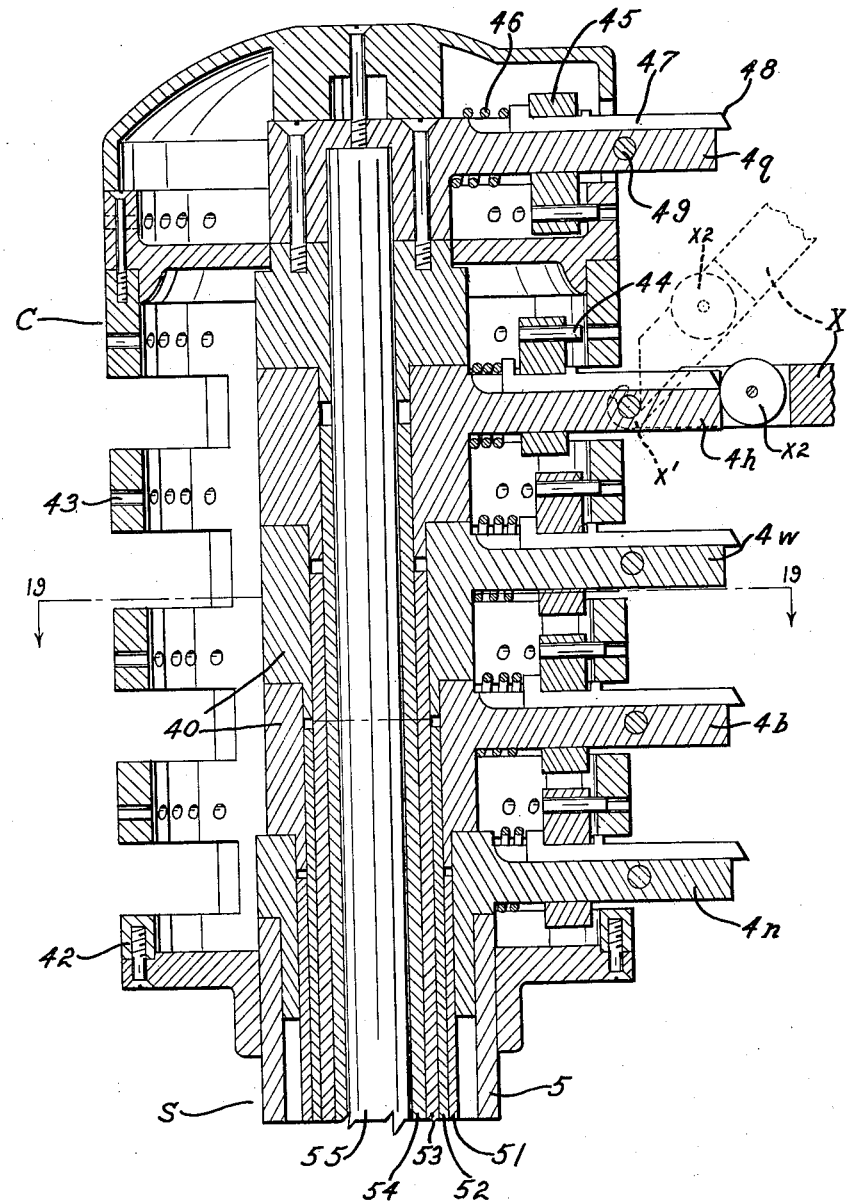
Fig. 5 is an axial section through the control head.
Figure 11:
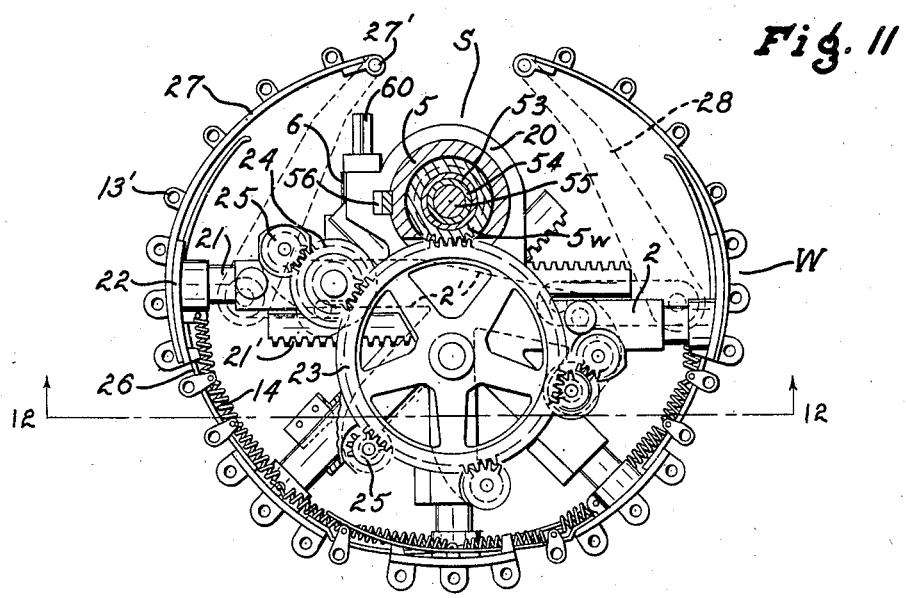
Fig. 11 is a plan view of the waist expander.
Figure 12:
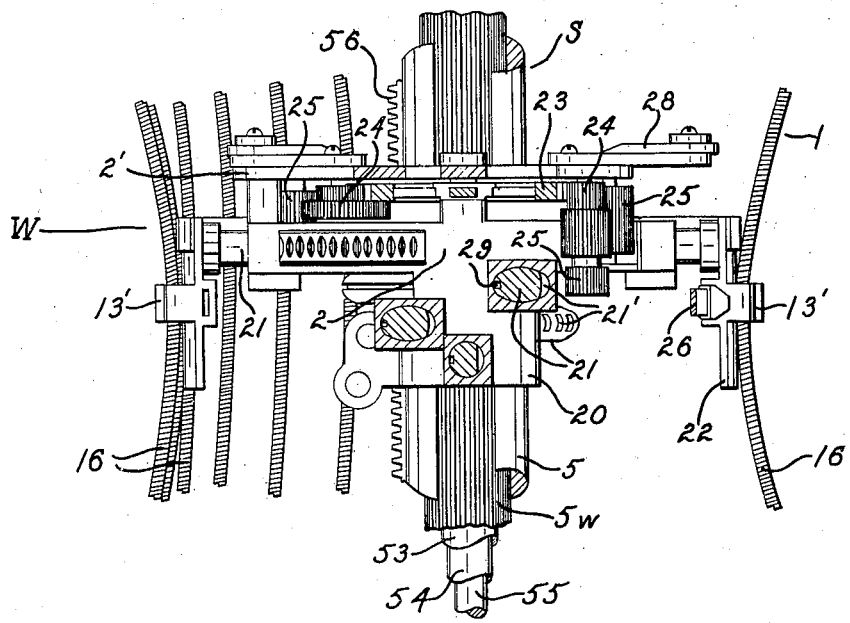
Fig. 12 is in part an elevation and in part a section through the same on the line generally indicated at 12—12 in Fig. 11.

The control head is shown in Fig. 5, and likewise in Fig. 19. It is shown as supported upon the upper end of the support S. In effect it consists of a plurality of sleeves 40 rotatably mounted upon the support or upon means extending above the support and arms 4 which project from these sleeves for securement of a wrench X to turn the sleeves. To distinguish the arms 4 they have been designated 4n, 4b, 4w, 4h and 4q, the arms thus designated controlling respectively the expansion of the shoulder, of the bust, of the waist, or the hips, and of the hold-down ring.

Since it is desirable to lock each expander in any given position of adjustment, both for accuracy of adjustment and in order to prevent maladjustment by the resistance of the longitudinals 1, a lock is associated with each of the arms 4.

The control head as a whole is formed as a housing 42, peripherally slotted for the movement of the arms 4, and fixedly—that is, non-rotatively—secured upon the upper end of the support S. Adjacent the path of each arm 4 it is provided with a plurality of holes 43, in any one of which may be secured a locking pin 44, carried upon the arm 4, and which, when engaged in one of the holes 43, indicates expansion of the corresponding expander to a definite size, and locks it in such position. This size is indicated adjacent the hole upon the exterior of the housing 42.

The locking pin 44 is carried upon a slide 45, shiftable lengthwise of the arm in opposition to a spring 46 by a finger 47, beveled at its outer end 48, and projecting somewhat beyond the end of the arm 4. The arm is likewise provided with laterally directed pins or trunnions 49, for the anchorage of the wrench X.

The wrench has a bifurcated end provided with hooks $x'$, which engage the pins 49, and a roller $x2$, which, when the wrench is pressed downwardly after thus engaging its hooks $x'$ with the pins 49, engages the beveled end 48 of the finger 47, thereby pressing the finger 47 inwardly and correspondingly pressing inwardly the slide or ring 45 and the locking pin 44, to disengage the latter from a hole 43, as is best shown in conjunction with the arm $4h$ in Fig. 5. With the locking pin 44 disengaged, the arm 4 and its corresponding sleeve 40 may be rotated to any new position of adjustment, the wrench X serving as a convenient added leverage to effect such movement. When the locking pin 44 is engaged in a new hole, by lifting the wrench X, it is thereby insured that the form may not change in its adjustment at the zone corresponding to the particular arm 4 which has been thus moved.

The support S includes an external tube 5 which at its lower end is provided with a bearing element 50, so that it may be received within a suitable vertical socket and the entire form rotated by such a rotatable mount, yet with respect to the control head and to the several expanders the external tube 5 may be considered as non-rotative. Within it are received a plurality of concentric rotative tubes 51, 52, 53 and 54, and a central rotative rod 55, which might, however, be a tube. As is best seen in Fig. 5, these rotative elements within the control head are connected, respectively, the tube 51 to the arm $4n$, the tube 52 to the arm $4b$, the tube 53 to the arm $4w$, the tube 54 to the arm $4h$, and the rod 55 to the arm $4q$. These rotative tubes and rods extend downward through the support to transmit the rotary movement of the respective arms to the respective master gears.

Referring to Fig. 3, it will be seen that the tube 51 is comparatively short and extends downward only to the shoulder expander. At this point it is provided with a gear $5n$ directly upon the lower end of the tube 51 and within the non-rotative tube 5, this gear $5n$ in this particular instance meshing, through a slot in the tube 5, with the teeth of the rack bars 32, and constituting the master gear for the shoulder expander.

The tube 52 extends on past the lower end of the tube 51, and upon it is secured the gear $5b$, within the non-rotative tube 5, and meshing with the master gear 23 of the bust expander B.

The tube 53 extends beyond the lower end of the tube 54, and upon it, within the tube 5, is secured the gear $5w$, meshing with the master gear 23 of the waist expander W.

The tube 54 extends beyond the lower end of the tube 53 and upon it, within the tube 5, is secured a gear $5h$, which meshes with the master gear 23 of the hip expander H.

The rod 55 extends beyond the lower end of the tube 54, and down to the lowermost or hold-down ring Q, where a gear $5q$ within the non-rotative tube 5 is secured upon it, which gear meshes with the master gear 23 of the hold-down ring.

Each of these gears, with the exception of the gear $5n$ and the gear $5q$, are preferably of appreciable longitudinal extent, for the reason that the several expanders, with the exception of the shoulder expander N and the hold-down ring Q, are adjustable vertically along the support S, and it is desired that the master gear mesh with its driving gear within the support in any vertical position of adjustment. It is also obvious that the non-rotative tube 5 of the support will have to be slotted throughout a large part of its length, in order to permit meshing of the driving gears within it with the master gears without it.

*Vertical adjustment*

Each of the expanders B, W, H, and R are vertically adjustable along the support, and to this end the support is provided with a rack bar 56. Each sleeve 20 is provided with a guide to receive this rack bar, and this arrangement serves as a key to prevent rotation of the expanders about the supporting tube 5. A rack pinion 6 (for detail see Fig. 22) is journaled upon each of the sleeves 20 of a vertically adjustable expander, in mesh with the rack bar 56, and is provided with a non-circular spindle 60 whereby it may be turned. Since each expander is reasonably heavy, and since it might thus tend to drop by its own weight or be forced downward by the contracting action of the longitudinals 1, and for other reasons noted hereinafter, it is necessary to provide means to lock each expander in any vertically adjusted position, and this may readily be accomplished by means of a dog 61, pivoted at 62 on the sleeve 20, and held by a spring 63 in engagement with the pinion 6 to prevent the latter's rotation. If the pinion cannot rotate, the sleeve cannot move vertically, for the pinion is in mesh at all times with the fixed rack bar 56. In order to release the lock thus formed, it is necessary, by reaching within the form at the rear, to apply a wrench to the spindle 60. This wrench (not shown) may be so formed that its spindle-engaging portion engages and presses outwardly a latch 64 fast upon the pivot pin 62 whereon the dog 61 is also secured. By thus throwing outwardly the latch 64, the dog 61 is thrown outwardly, and the pinion 6 is released. By this time, however, the pinion is held by the wrench, mounted upon the spindle 60, and the spindle and pinion may be rotated at will by the engaged wrench. Upon withdrawal of the wrench from the spindle 60 to a point beyond the range of latch 64, the spring 63 snaps the dog 61 back into engagement with the pinion 6, and parts are held automatically in the vertically adjusted position. The engagement of the wrench with the spindle 60, to an extent insufficient to engage the latch 64 and to release the dog 61 will still permit the wrench to turn spindle in a direction to move the expander upward, the dog 61 merely ratcheting over the teeth of the pinion 6. To lower the expander, however, the wrench must engage the latch and throw out the dog 61.

As is best shown in Fig. 10, the sleeve 20 may be provided with a sight opening 20' and the non-rotative tube 5 may be provided with index figures cooperating with an index associated with the sight opening 26', as for instance an edge of the latter, so that the user may determine the relative spacing of the zones defined by the several vertically adjustable expanders.

The locking of the expanders in vertical position is necessary primarily in order to insure that expansion of the dress (or its sizing and shaping) will be correct at each zone or level, and that it will not bulge at a level above or below the correct level—only at the correct level. Locking to resist tendencies of the mechanism to relax or to shift parts, as mentioned above, is also necessary, and the dress itself, if it must be stretched, also exerts a powerful tendency to shift parts. To resist departure from a set position, from whatever cause, is the function of the lock.

The hem holder

The hem holder R may be considered as an expander, and in general it is similar to the other expanders, with the two exceptions, first, it is preferred that the several face plates be individually moved in and out by hand, and second, these face plates do not engage nor control the position of the longitudinals which define the form, but rather the position of the face plates of the hem holder is determined by the position of these longitudinal elements, as determined in turn by the positions of the other expanders.

The hem holder, like the other expanders, includes a spider 2, with its sleeve 20 supporting the hem holder from and for vertical adjustment along the support S, and the face plates are supported upon arms 21, which are grooved at 29 to prevent their rotation, and which have no rack teeth, since the radial movement is manually accomplished. The face plates, however, are somewhat differently constructed from the other face plates, and such a face plate for the hem holder is shown in detail in Fig. 21.

These face plates are designated by the numeral 7. Rather than forming them fast on the end of the arm 21, the back of each face plate is formed with a transverse guide 70, within which is received a slide 71, which is secured to the outer end of the arm 21, so that the face plate 7 may move transversely with respect to the supporting arm 21. The arm 21 may be angled as necessary with respect to the slide 71. Stops 72 prevent disengagement of the slide 71 from within its guide 70.

Each face plate is vertically slotted, as indicated at 73, see Fig. 16, to receive and guide a headed bolt 74 secured in a vertical slide 75, movement of which in a downward direction is resisted by a spring 76. Formed upon the slide 75 is a clip 77 cooperating with a clip 78 thereabove, fixed upon the face plate 7, thereby to hold between them a carding tape T.

This carding tape may be stored, when not in use, in a spiral container 79 supported from the spider 2, at the same level as the clips 77, 78. Any portion not required, when the form is not expanded to the maximum, may remain within the spiral container.

When the dress is to be supported upon the form the hem holder R is adjusted to the proper length of the skirt, as determined by previous measurement, the adjustment being accomplished by a wrench received upon the spindle 60 as previously described for the vertical adjustment of other expanders. Having been adjusted to proper height, or length of skirt, the plates 7 are moved outwardly, the cooperating clips 77, 78 thereof being extended between adjoining longitudinals 1 of the form, and it is to this end that the transverse adjustment of the plate is desirable, so that regardless of the positioning of the longitudinals by the operation of the other expanders, the clips 77, 78 can still project through without appreciably disturbing the longitudinals. Once these several clips are in position, externally of the form, the carding tape T is drawn from its storage spiral 79, and by drawing downwardly on the clips 77, carried upon the slides 75, the carding tape may be engaged between each of the pairs of clips 77 and 78, and held in position externally of the form. It is shown in Fig. 15 in such position of adjustment. Now it may be drawn inwardly toward the form to lie just in contact with the longitudinals 1, and the hem of the dress may be engaged with the outstanding pins of the carding tape, to hold the hem to the proper length.

The sleeve form

The sleeve form A, shown in detail in Figures 23 to 29 inclusive, may be used or not, as desired, but for convenience of placing the dress on the main form and removing it, the sleeve form should be removable, and adjustments of the sleeve form are controlled wholly within itself, not from the main control head C.

The sleeve form incorporates a plate 36 provided with attaching devices including a hook 37, which complementally engage the face plate 31 of the shoulder form N. When the sleeve form is thus supported it constitutes an arm projecting laterally and inclined downwardly from the shoulder form, as is seen in Figs. 1 and 3.

Extending from the plate 36 is a skeleton frame member 8, terminating in a wrist piece 80, and two slides 82 and 83 move along a guide 81, extending along the frame member 8. Movement of these slides is governed by the respective screws 84 and 85, journaled in the wrist piece at 80 and otherwise unsupported except by the slides within which they are threaded, each being provided with a non-circular head for the engagement of a wrench Y, whereby the screws may be rotated and the slides moved along their guides.

The arm A further incorporates an element 86 which is supported in part from the slides 82 and 83 and in part from the main support 8 of the arm. A link 87 is pivoted at 87' adjacent the plate 36, and at 86' to the opposite end of the member 86. A link 82' connects the slide 82 with the inner end of the member 86, being directed inwardly from the slide 82, and a link 83' connects the slide 83 with the outer end of the member 86, being directed outwardly from the slide 83.

It is evident that with the slides 82 and 83 drawn to the positions of their nearest approach, as shown in Fig. 23, the member 86, by the cooperative action of the links 87, 82' and 83', will be drawn to its position of closest approach to the frame member 8. Now if the slide 82 is moved toward the shoulder form N, from the position of Fig. 23 toward the position of Fig. 24, but if the slide 83 is held stationary, the inner end of the element 86 will be thrown outwardly and downwardly, and in this way the sleeve form may be expanded to fill out a sleeve which is belled or enlarged adjacent the shoulder or armpit. Conversely, if the slide 82 is held in its position of Fig. 23, and the slide 83 is moved outwardly, the outer end of the element 86 will be separated from the member 8, and a sleeve which is flared at its outer end will be expanded thus. If both the slides 82 and 83, to the degree required, be moved from the position of Fig. 23, into positions corresponding to those of Fig. 24, both ends of the element 86 will be moved outwardly and away from the member 8, with the result that a sleeve which is large over all will be expanded.

Means may be provided for indicating the degree of movement of each of the slides 82 and 83, or, more conveniently, such a device may be calibrated in terms of circumferential measurement at the top and bottom of the arm or sleeve form. For instance, the wrist piece 80 is shown as provided with a sight opening 86', and disks or rings 84' and 85', mounted within the wrist piece 80 and geared to the respective screws 84 and 85, serve to indicate through the sight opening 86' the setting of the respective slides 82 and 83. These parts have sufficient frictional engagement with each other, or with adjacent parts, to remain in any adjusted position.

To control and determine the length of sleeve, a slide 88 is slidable along the member 8 and is tiltable somewhat with respect to the latter, to engage its locking pin 88' in holes 8' in the member 8, spaced apart by graduated distances to govern the sleeve length, and this slide may carry upon it a length of carding tape $t$, to engage with the cuff or outer end of the sleeve. Instead of merely inserting the positioning pin 88' in a selected one of the holes 8', the parts may be positively locked in position by a notched pin 88'', as shown in Fig. 23, cooperating with an inclined pin 81' engaged in another such hole 8', see Fig. 25, the pin 88' being carried upon a spring-held element 89 mounted upon the slide 88, and being releasable by movement of this sliding lock 89 to release the notch in the pin 88'' from the hole 8' within which it is engaged.

Employment of the form

The form as a whole is always maintained upright, though by the mounting at 50 within an upright socket 59 (see Fig. 4) it may be rotatable about the axis of the support S. A dress or skirt or other garment to be finished is placed upon the form, which is usually first collapsed to a minimum position, at least to a position appreciably smaller than the desired measurements of the dress. Prior to placing the dress on the form the several expanders have been adjusted vertically, so that their relative spacing, and therefore the relative spacing of the several zones with relation to each other, is in accordance with the spacing desired in the finished dress, and is in accordance with measurements previously obtained, either from the wearer of the dress or from the dress itself before cleaning.

Now with the dress draped loosely upon the form, the form is expanded by operation of the controls at the control head C in each of the several zones of expansion, the hem holder is moved outwardly, and the carding tape T is located in proper position. If the sleeve forms A are to be used, these forms are inserted within the sleeves and attached to the plates 31, and are expanded to the proper measurements, both at top and bottom of the sleeve, and the carding piece $t$ is located at the proper length, if this is of importance.

The form has now reached a very close approximation to the precise form of the wearer for whom the dress is intended, and the entire adjustment has been conveniently, quickly, and accurately accomplished at the control head C, with the exception of the adjustment of the sleeve forms. The dress lies smoothly upon the exteriorly convex face plates 22, both at the bust and at the hips, and while it is held upon a skeleton-like form, which throughout is pervious for the dissemination of a fluid medium through the form, it is nevertheless held properly against shrinkage, and expanded in the correct ratios in the different directions at each zone. The hem is held to the proper length relative to the waist, and even though there be a greater than normal bulge at the hips, for instance, the hem is still held down properly and evenly all around. The form adapts itself readily to wide variations in measurement, both circumferentially and in spacing of the different zones, and some of these variations are indicated in the dash lines of Fig. 3. Since the form in each zone corresponds to previous measurements at that zone, either of the dress or of the wearer (preferably of the wearer), the dress must of necessity be held to the proper size at each zone, and to the proper length, and cannot shrink to a lesser measurement. If it has been stretched before it is put upon the form, the excess can be evenly adjusted about the form, and as the garment is dried it will be shrunk evenly, and back to the proper size.

The finishing operations may be varied in character, depending upon the manner of cleaning the dress, the material thereof, the weave, etc., and will be discussed in detail hereafter. Generally speaking, the finishing involves a drying operation, to accomplish which a fluid medium, for instance air, at some selected temperature or at different temperatures, is discharged within the form and within the dress thereon, to be disseminated throughout the form and to issue through the interstices in the dress material, and the structure of the form and its mounting and associated mechanism are particularly designed to permit the accomplishment of such finishing operations as are required, upon any or all sorts of dresses or materials, and regardless of the variations in detail in the finishing operations which may be required by different materials, previous operations, and the like.

Upon completion of the finishing operation the form is collapsed, again by an operation at the control head C, the sleeve forms are collapsed and removed, and now the dress, smooth and finished to the proper size, is removed from the form, over the head thereof, and normally requires no further finishing operations, unless it be ironing of collars, etc. It is substantially ready for delivery to the wearer.

The present form is of advantage in connection with spotting operations, greatly simplifying this troublesome phase of the cleaner's problem. As now practiced, spotting operations produce rings which in turn require that the dress be cleaned in effect, with all the attendant difficulties of sizing, etc., and therefore increase the cost to the cleaner and to the customer. By the use of the present form, and with a light within the dress while it rests upon the form, spots can be readily detected and can be eliminated by chemicals of the type now employed, which, being volatile, will spread and volatilize, but by the use of this form, and of the mechanism to be described thereafter for discharging air and steam within the form, or even steam alone, the form may be immediately charged with steam before the volatile chemicals used in spotting have volatilized, and thus by blowing them out and volatilizing them with the steam, the formation of a ring is prevented. It follows that the cleaning heretofore necessary after spotting is eliminated, and because the dress is held upon the form in the proper size during spotting and during the subsequent steaming, it follows also that the dress is not altered in size, and is ready for delivery to the customer immediately the spotting operations are completed. The spotting becomes actually the simple operation it is presumed and intended to be, and its cost is lessened, with obvious advantages to the cleaner and to the customer.

Air and steam controls

Figure 30:
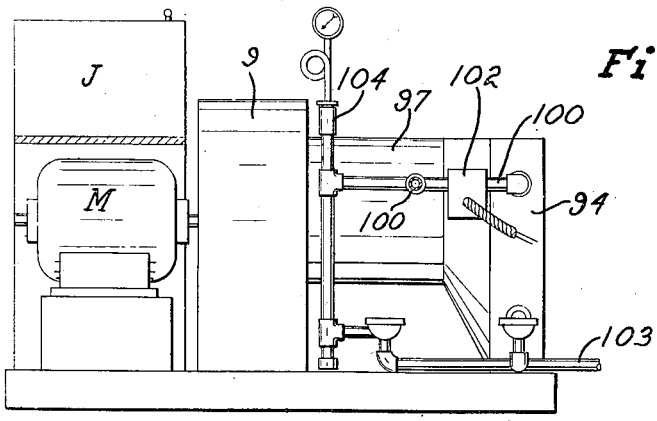
Fig. 30 is a general rear view of the fluid discharge unit.

The general arrangement of the mechanism for discharging a fluid medium or media into the interior of the form, and the relationship of the form to such discharging means, are shown in Figs. 1, 2 and 30, and to some extent in Fig. 4. Usually the media employed are (1) air, at ambient temperature, (2) heated air, or (3) steam, or such combination of these three media in relationship to each other as may be required by the particular dress material or weave. Each of them is a fluid medium, and to control and contain such a fluid medium, which is delivered from a blower 9, for instance, through a duct 96 and boot 90 well below the normal position of the hem of a dress on the form, I provide a flexible sleeve 91, of closely woven cloth or similar material, or which may be rubberized or otherwise coated to make it more impervious to the passage of such a fluid medium. This sleeve 91 is anchored by the clamp ring 92 to the base ring 29' (see Figs. 4 and 18), and is connected at its upper end to move upwardly and downwardly with the adjustment of the hem holder R, as, for instance, by the hooks 93 shown in Fig. 4, which engage either the carding tape T or the face plates which support the latter. A screen 96' adjacent the inlet to the sleeve 91, keeps debris and sleeve 91 from falling into the boot 90, and serves to smooth out the flow into the sleeve 91 and hence into the interior of the garment. The sleeve 91 is of such length as to accommodate the extreme upward adjustment of the hem holder R, and, of course, may collapse downwardly, yet without permitting leakage of air in any position of the hem holder.

Blower 9, driven by motor M, draws air through radiator 94 by way of duct 97 and discharges this air into the form by way of duct 96 and boot 90. A manually operated damper 95 accurately regulates the volume of air permitted to enter the blower 9 and to be discharged into the form. Steam supplied through a pipe 100 past a cut-off valve 101 through pipe 104 and operator-controlled valve 105 to pipe 107, which terminates at any selected point 108 within the passage made up of duct 96 and boot 90, is discharged adjacent to the lower opening of sleeve 91 leading to the interior of the form. Valve 105 is normally closed but may be opened at will by the operator by pressing upon pedals 106. Pedals 106 are carried by a rock shaft 109, and downward movement of the pedals 106 thus raises rod 105', the upper portion of which lifts valve plunger of valve 105 and allows steam to enter pipe 107 and to discharge at point 108. Steam supplied also from pipe 100 past cut-off valve 101 may enter and heat the radiator 94 through or past a solenoid-controlled valve 102, and the radiator 94 is drained through a connection 103.

Such traps, gauges, and the like as are normally employed in such a steam system are incorporated in the present system, but need not be described in detail. The construction of boot 90 is such that the water of condensation, if any is present, flows to a central point and drains through an orifice provided.

It is preferred that automatic time controlling mechanism for the ambient air and heated air be employed, and such mechanism, shown in Figs. 31 to 34, will be described in detail hereafter. It is only sufficient to note at this point that it is possible, and in many cases desirable, to discharge first into a dress upon the form air at ambient temperature for a certain period of time, and then to discharge air heated to a higher temperature into the dress for a further period of time, and then to cut off the supply of air. Also in certain special cases, for instance in dealing with velvets, it is desirable to discharge steam alone directly into the dress, or into the air stream which is passing to the dress, impelled by blower 9, whether that air be heated air or air at ambient temperature, and it is for this purpose that the pedals 106 and the valve 105 are provided. However, manual controls are also provided and emergency controls for use as needed, and the operation of the fluid discharge device will be described first without reference to the automatic controls.

Since it has been found desirable first, in most instances, to discharge air at ambient temperature into the dress, the steam is not at first admitted to the radiator 94, and upon starting the blower 9, air at ambient temperature or tempered to any desired temperature is drawn through the radiator, and the air at these temperatures is impelled by the blower through the duct 96 and boot 90, and thence through the flexible sleeve 91 directly into the bottom of the dress. The sleeve 91, being adjustable with the hem holder, insures that the air is confined and that substantially all of it is delivered into the interior of the form and of the dress thereon. Air thus delivered is permitted to pass with sufficient freedom throughout the entire interior of the form, the construction of the expanders and of the form itself being such as to permit this dissemination throughout the form and the passage of the air substantially freely through all parts of the dress fabric. If the sleeve form A is used, the air passes into it from within the main form, and out through the material of the sleeve.

The discharge of air either ambient or tempered is continued for a certain period of time, and in most cases it is succeeded by air of higher temperature. To the latter end steam is admitted by means of the normally open valve 101 and solenoid valve 102, into the radiator 94, and the temperature of the air, being drawn by and into the blower through the radiator, is raised thereby and is delivered in the same way as before to the interior of the dress on the form. This preheated air completes the drying of the dress, and since the dress is stretched over the form, this accomplishes results similar to those obtained by the use of a flatiron, smoothing the surface of the material. After a sufficient period of time the air supply is cut off by stopping the motor M, and the dress may be removed from the form. Solenoid valve 102 operates to cut off supply of steam to the radiator 94 simultaneously with stopping of motor M.

In drying a velvet dress, according to present practice, steam is sometimes discharged from a hand nozzle into the interior of the dress as it hangs upon a hanger, to lift the pile of the fabric and to prevent the formation of high lights, which are merely areas where the nap or pile has been flattened. The same result may be accomplished in the present device by the controlled discharge at will of steam through the branch 104, valve 105, pipe 107, and the nozzle 108 and thence into the dress, the discharge being effected by pressure upon either one of the pedals 106, which controls the opening of the valve 105. To obtain the best results under certain conditions and for certain fabrics, this discharge of steam may be supplemented as desired by air at selected temperatures and in selected volume impelled by blower 9 through duct 95 to boot 90 where it is mixed with steam emitted from nozzle 108, the mixture continuing upward into the garment on the form. In similar fashion, should the dress, of whatever material, tend to dry prematurely, discharge of steam into the air stream will serve to moisten the dress and thereby retard the drying and finishing of the dress.

The automatic time control

As has been indicated, the discharge of unheated air and of heated air should each be for definite periods of time, though perhaps varying with different materials, and in definite ratio to each other. To avoid the necessity of an operator standing by, and to avoid reliance upon the judgment of an operator or possibly improper results due to his inexperience or negligence, I have provided an automatic control which will in succession effect the discharge of air at ambient temperature or tempered air for a definite period of time, the discharge of heated air for a second definite period, and which will finally stop altogether the discharge of air into the interior of the form. This automatic control device, as previously pointed out, is illustrated in Figs. 31 to 34 inclusive. This automatic control device as a whole is designated by the letter J.

Figure 31:
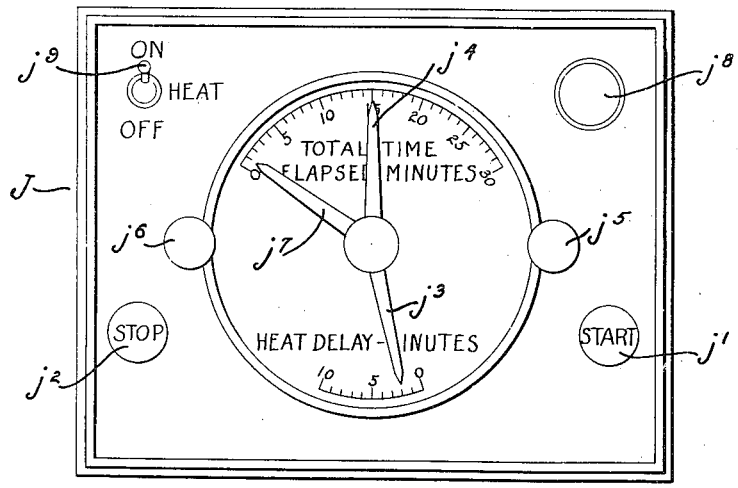
Fig. 31 is a plan view of the automatic timing control device.

Its functions will be understood from Fig. 31. It is provided with a starting button j1, a stop button j2, setting index hands j3 and j4, controls for setting the same, indicated at j5 and j6, one of which controls the hand j3 and the other of which controls the hand j4, a traveling indicator hand j7, and a switch j9 controlling the supply of heat. The several hands move with relation to a graduated scale or disk. These is also a signal or pilot lamp j8, which when lighted indicates that the solenoid valve 102 is open.

The hand j3 is set to delay heating of incoming air by radiator 94 by reason of its control or solenoid valve 102 for a selected period of time, permitting the air tempered or at ambient temperature to be supplied first, and then at the end of the period indicated by the hand j3 solenoid valve 102 operates to admit steam through pipe 100 and valve 101 into radiator 94, thereby heating the air being drawn through it by action of fan 9. This heated air then passes into the interior of the form, and continues for a time determined by the setting of the hand j4, at the end of which time the motor M stops, solenoid valve 102 closes the steam line to radiator 94, and the supply of air ceases. The hand j7 moves over its indicator as long as either air is being supplied by the blower, and when the hand j7 reaches coincidence with the hand j4, the motor M is cut out and the supply of air ceases.

The function of indicator j7 is to give a visual indication of the actual elapsed time from the start of the operation to any point between start and selected finish time. It is particularly valuable because it accurately and visually indicates, even to an inexperienced operator, the exact time required for finishing any given weight or weave of fabric, and, as radio dials are sometimes calibrated by the call letters or names of stations, rather than the kilocycles of such stations, so here the disk may be calibrated, alone or additionally, to indicate particular fabrics or weights or weaves, instead of merely time units.

The autmatic control is accomplished through the medium of a cam 110, carried upon a spindle 111, whereon is secured the indicator j7. A gear 112 is in effect integral with the cam and rotates with the latter, and this gear 112 is driven from a small self-starting synchronous motor m. The synchronous motor m rotates at a speed of one revolution per minute, and the spindle 111 is driven at a speed of one revolution in 90 minutes (though these figures are preferred, it will be understood that any other ratio may be employed), and this result is accomplished through two intermediate gear and pinion sets 118 and 119, the pinion of the last pair 119 meshing with the gear 112.

During the time that the motor m is driving the gear 112 and the cam 110 it operates against the slight resistance of an extension spring 114, anchored at one end, and having a cord or cable 115 secured to its other end and wound about a drum on the spindle of the gear and pinion pair 119. Arrangements to be presently described are provided for declutching the synchronous motor m from the gear and pinion pair 119, and when this occurs the extended spring 114 drives the gear 112 reversely, and returns it and the cam 110 and indicator j7 to a zero position, which is determined by an adjustably stop 113, in cooperation with a fixed stop 113', shown by dotted lines, Fig. 33.

Two segments 116 and 117 are rotatable about but not fast to the spindle 111. Each of these segments is adjustable independently of the other, by means of gear teeth upon their respective peripheries in mesh with pinions 116' and 117', respectively, which are connected in turn to the control knobs j5 and j6. As the knob j5 is turned to adjust the setting of the segment 116, the indicator j3, which is connected to turn with the segment 116, is also adjusted in position, and similarly when the knob j6 is turned to adjust the segment 117, the indicator j4 is likewise and similarly adjusted in position. These segments 116 and 117 support certain switches, forming part of the automatic control device, which will be referred to hereafter.

The declutching of the synchronous motor m from the gear and pinion pair 119 is accomplished by a lever 120, a bifurcated end of which is engaged with the gear and pinion pair 118, and the other end of which is connected to or positioned in the path of movement of a plunger 121 which is connected for movement to the start button j1. The lever 120 is pivoted at an intermediate point 122, whereby upon inward pressure on the button j1 the pinion of gear and pinion pair 118 is moved out of mesh with the gear of the pair 119. As has been indicated above, when this action occurs the spring 114 returns the cam 110 to its zero position.

Figure 32:
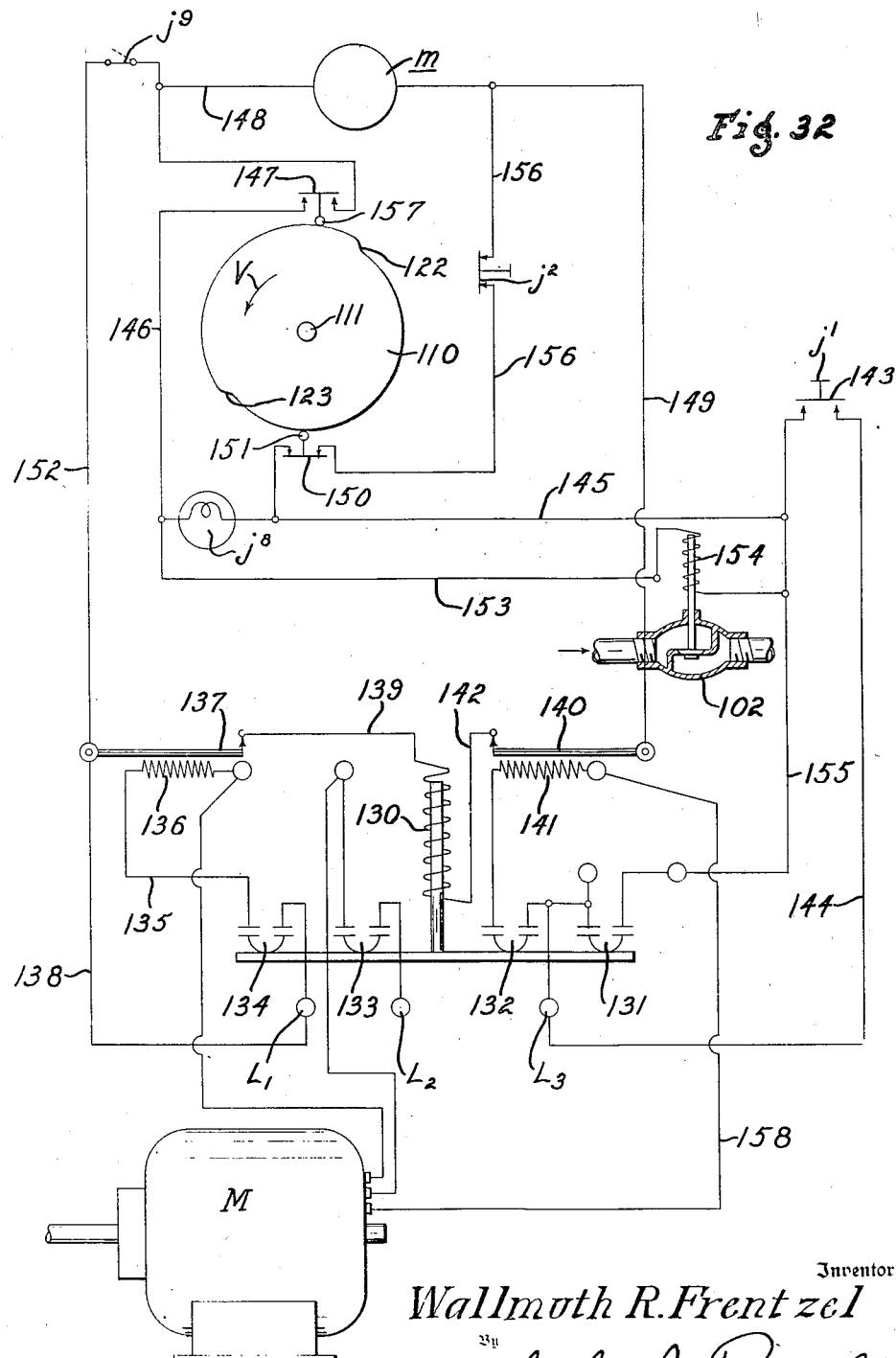
Fig. 32 is an electrical diagram of the automatic timing control device for fluid discharge.
Figure 33:
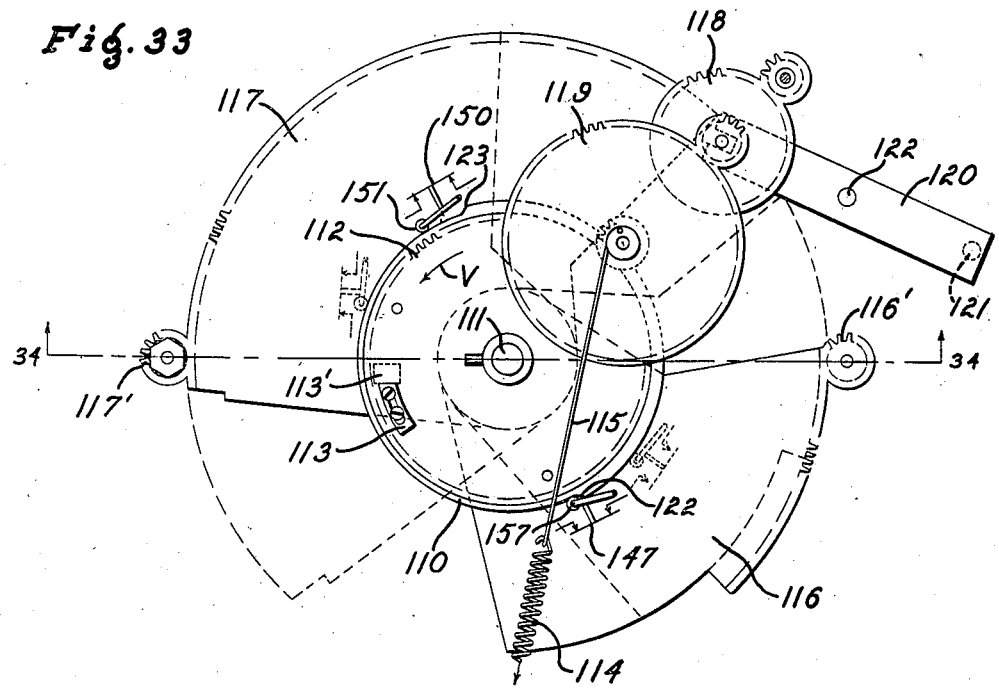
Fig. 33 is a plan view of parts of the automatic timing control device.
Figure 34:
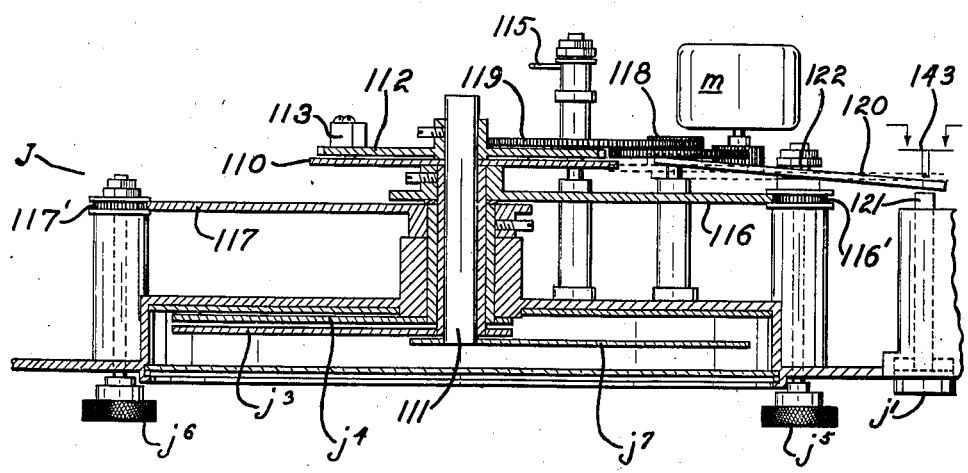
Fig. 34 is a section through the same substantially on the line 34—34 of Fig. 33.

Referring now to Fig. 32, it will be seen that there is provided a four pole double break magnetic relay switch 130 having contacts normally open, these contacts being designated 131, 132, 133 and 134. Three of these, the poles 132, 133, and 134, are employed to control the current to the blower motor M, and the fourth, the pole 131, breaks the circuit feeding the solenoid valve 102 with its pilot lamp 78. This contact 131 also forms the circuit for the electric interlock to be described presently. If the motor M is a single-phase motor instead of three phase, as shown, the pole 133 is not needed. Current is supplied from a suitable source to the terminals L1, L2, and L3, or in the case of a single-phase motor, to terminals L1 and L3.

In the line 135 from the pole 134 is included an overload relay, wherein a heating element 136, disposed adjacent a normally closed thermal switch 137, will heat rapidly and open the relay and motor circuits, in the event of an overload, such arrangements being common in like circuits. The bimetal switch arm 137 is connected to the terminal L1 by a line 138, and leads by a line 139 to the winding of the magnetic relay switch 130. A second similar overload relay cut-out is employed, the heating element 141 whereof is connected to the terminal L3 through the switch pole 132, leading thence by the lead 158 to another pole of the motor M. Its bimetal switch arm 140 is normally closed to maintain the circuit through the winding of the magnetic relay 130 by a lead 142, but is opened upon the imposition of excessive current. Both the thermal relay cut-outs 137 and 140 are self-resetting, and require no attention from the operator. Although poles L1 and L3 are used in the case of a single-phase motor, only one of the thermal contact switches 137 and 140 is needed. Either one may be omitted and the gap bridged directly from its corresponding pole L to the motor terminal. This is common practice and need not be described in detail.

To understand the electrical circuits and the operation of the automatic time control device it must be remembered that the cam 110 had brought a preceding cycle to a stop, and this stopping had occurred by reason of the cam follower 151 of switch 150 riding up on the incline 123, as the cam had rotated in the direction of the arrow V, shown in Fig. 32, thereby opening switch 150. At the moment the cam had stopped, the switch 147 was closed, due to the fact that, previous to the stopping by opening of the switch 150, the switch 147 had been closed by its follower 157 riding down the incline 122 of the cam. The maintaining-contact switch 79 must be closed, for automatic operation, this being manually accomplished by the operator. At zero position of the cam, however (that position which is shown in Fig. 32), the cam has just been rotated in the direction opposite to the arrow V by the spring 114, as previously described, and now in this illustrated zero position the switch 150 is closed, and the switch 147 is open. Upon the commencement of the automatic operation the cam 110 begins to rotate in the direction of the arrow V.

To initiate the operation, then, the button 71 is pressed, momentarily closing the switch 143, but first returning the cam 110, by the mechanism previously described, to the zero position shown in Fig. 32. Closure of the switch 143 connects the terminal L3 through the lead 144, the switch 143, and the lead 145 to the now closed switch 150; the circuit is completed to terminal L1 by way of the lead 156, which includes the emergency stop switch 72, normally closed, and thence by lead 149 through the overload relay 140 and lead 142 to the winding 130 of the magnetic relay, and finally to the terminal L1 by lead 139, overload relay 137, and lead 138. This energizes the magnetic relay, and closes all the poles thereof, and the magnetic relay 130 remains energized and the switches controlled thereby are closed so long as the switch 150 remains closed. This is true because the winding 130 always remains energized, as long as the circuit including leads 145 and 156 is closed, through the interlock pole 131. However, if the circuit is opened by opening the switch 72, or the overload switches 137 or 140, the result is the same as if the switch 150 is opened. The automatic opening of the relay circuit, and hence of the motor circuits, by the opening of the switch 150, is normally the final act in the automatic operation.

As a result of closure of the switch 150 and of the magnetic relay 130, the synchronous motor m is energized, current being supplied from the terminal L1, through leads 138, 152, switch 79, and lead 148, and thence through lead 156, switch 150, leads 145 and 155, and through the pole 131, back to the terminal L3. The energization of the synchronous motor m, thus commenced, continues as long as the switch 150, or the equivalent switches previously referred to, remain closed, and its operation is stopped automatically by the opening of the switch 150.

At this time the winding 154 of the solenoid valve 102 is not energized, for the first action of the automatic time control mechanism is to deliver unheated air through the blower driven by the motor M, and to permit the delivery of steam through the valve 102 only after a predetermined time interval indicated by the setting of the indicator 73 and associated parts.

It will be seen that the motor M is energized upon the closing of the magnetic relay 130, current being supplied from the terminal L1 through the pole 134, lead 135, and element 136 to one terminal of the motor; from the terminal L2 through the pole 133; and from the terminal L3 through the pole 132, element 141, and lead 158. The motor therefore continues to operate to deliver air from the blower so long as the magnetic relay 130 is closed, but ceases to operate upon the opening of the magnetic relay 130; the latter, as previously explained, opens automatically upon opening the switch 150 at the close of a cycle, or by opening the switch 72 in an emergency, or by operation of the overload switches 137 and 140 in the event of an overload.

After a certain period of time the cam 110, driven by the synchronous motor m, reaches a point (prior to opening of the automatic stop switch 150) where the cam follower 157 rides down the incline 122, thereby closing the switch 147. When this occurs, the solenoid winding 154 of the valve 102 is energized, and that valve is opened. Current is supplied from the terminal L3 through the pole 131, the lead 155, the winding 154, the lead 153, the lead 146, the now closed switch 147, the closed switch 79, and back to the terminal L1 through the leads 152 and 138. Thus the valve 102 is opened by energization of its winding 154 immediately upon the automatic closing of the switch 147, which occurs prior to the opening of the switch 150.

The closing of the switch 147 does not affect the operation of the synchronous motor m, and the cam continues to rotate, until eventually the cam follower 151 rides up the incline 123, thereby opening the switch 150, and immediately upon opening this switch the relay winding 130 is deenergized, the magnetic relay is opened, and all operations cease.

The pilot lamp j0 is connected in parallel with the coil 154 of the solenoid valve 102 and therefore is energized, and thereby lighted, at all times that the valve 102 is open, but the lamp j8 is not lighted at any time except when coil of the valve 102 is energized.

If the switch j9 is opened, the automatic control is ineffective, since the synchronous motor m cannot be energized, nor can the winding 154 or the pilot lamp j8 be energized. It is possible to energize the motor M, however, by closing the switch 143. Closing of the switch 143 closes the magnetic relay 130 in the manner indicated heretofore, namely, from terminal L3, through lead 144, switch 143, lead 145, now closed switch 150, lead 156, lead 149, overload switch 140, lead 142, winding 130, lead 139, overload switch 137, and lead 138 to terminal L1. The magnetic relay, being thereby energized, closes and is self-holding, as previously indicated. However, the cam 110 does not rotate, since the synchronous motor m is not energized, but the cam merely remains in zero position. Accordingly to stop the motor M it is necessary to press the emergency stop button j2, opening the circuit at this point, and thereby de-energizing the magnetic relay 130.

It will now be evident how adjustment of the positions of the segment-mounted switches 150 and 147, angularly about the axis of cam 110, can control the timing of the automatic operation. Let us assume that the dress upon which we are operating requires two minutes of air at tempered or ambient temperature, and then thirteen minutes of heated air. These figures, and this ratio, are merely taken to illustrate an hypothetical case. Before pressing the starting button j1, the knob j5 is rotated until the pointer J3 points to two minutes of heat delay, and this rotates the segment 116, carrying the switch 147 that controls opening of valve 102, backwardly from the cam's zero position sufficiently that the cam will advance two minutes before its incline 122 reaches and drops the follower 157, thereby closing the switch 147. Similarly, and likewise before pressure on the starting button j1, the knob j6 is rotated until the pointer j4 points to a total elapsed time of fifteen minutes, thereby rotating the segment 117 carrying stopswitch 150, backwardly from the cam's zero position sufficiently that the cam will advance fifteen minutes before its incline 123 reaches and raises the follower 151, thereby opening the switch 150. The timing depends upon the angle to which the switches 147 and 150 have been adjusted, relative to the cam's zero position.

Automatic operation, without the opening of the valve 102 and the consequent supply of heated air, can be obtained by setting the heat delay j3 to equal or exceed the total elapsed time. Obviously, by setting the heat delay at zero, automatic operation, with heated air alone, can be obtained by proper setting for the desired total elapsed time. In all cases, at all stages of operation; and whether operation is automatic or is manual, the steam valve 105 is always available to discharge steam within the dress on the form by merely depressing a spring-returned pedal 106. If the blower 9 is operating, steam discharged into the boot 90 by the opening of valve 105 is blown with the air into the form. If the fan is not operating, it is still possible to discharge steam, since the discharge nozzle 108 is projected towards or into the boot 90 as desired, and the steam rises thence into the form.

Since the operation of all parts has been explained in conjunction with the description of such parts, it is believed to be unnecessary to describe further the operation of the device as a whole.

What I claim as my invention is:

1. In a cleaner's garment sizing form, an upright support, expanding means surrounding said support at each of several zones, as the bust, the waist, and the hips, unitary flexible and inherently extensible means carried by said support and engaged by said expanding means to define a figure of generally human shape, and means to expand or contract each of said expanding means each in its own plane simultaneously in substantially all directions in such plane radially about said support in an amount which is independent of the amount of contraction or expansion of every other expanding means, and in each expanding means to expand or contract by different radial amounts in different radial directions around said support, conformably to the relative variation of equivalent measurements in average human figures in such directions radially around a vertical line through the body, whereby to maintain the form, at each zone, expanded in the amounts in each radial direction conformably to the human figure and to the expansion at other zones.

2. A cleaner's garment sizing form comprising a figure of generally human shape defined by a plurality of longitudinal inherently extensible flexible elements, and supporting elements therefor, engaged therewith at points spaced along their length, the position whereof determines the contour defined by the flexible elements, and means incorporated in said supporting elements movable to adjust the same, in directions and by amounts generally corresponding to the variations in different human figures in corresponding regions.

3. A cleaner's garment sizing form comprising a figure formed of flexible tight coils extending from neck to hips, generally of the shape of a human torso, and means disposed at a plurality of different zones, and expansible at each zone simultaneously in substantially all directions, each in a single plane, but by different amounts in different directions, corresponding to the zones and amounts of human size variation, and actuating means movable only in the general plane of each such zone, to effect such adjustment.

4. A cleaner's garment sizing form comprising an expansive figure generally of human shape, and means to expand and contract the form, in a single plane at each of several critical zones, simultaneously in all directions, but by different amounts in different directions, said zones corresponding to the zones and amounts of human size variations, and means operable independently of all other such means, to adjust the position of each such expanding means vertically relative to all other such means.

5. A cleaner's garment sizing form comprising a figure generally of human shape, means to expand and contract the form, in a single plane at each of several critical zones simultaneously in all directions, but by different amounts in different directions, said zones being located to correspond to the waist, hips, or bust, and a rack and pinion means associated with each such expanding means, and operable independently of all other such means, to adjust the associated expanding means vertically relative to all other such expanding means.

6. A cleaner's garment sizing form comprising a figure shaped generally to the parts of the human body which are clothed by such garment, means to expand said figure simultaneously in substantially all radial directions, but by different amounts in different directions, in a selected zone or zones, such as the waist, bust and hips, and means to vary the spacing, lengthwise of the figure, of one such zone from another.

7. A cleaner's garment sizing form comprising an upright support, an enclosing figure generally of human shape and variable in size, carried by said support, a plurality of means, each adjustable lengthwise of said support, engageable with the figure at zones of size variation, as the bust, waist, or hips, and by such adjustment varying the spacing of such zones, said means being each simultaneously expansible in substantially all radial directions, each in its own zone but by different amounts in different directions, in any position of adjustment, to vary the radial amount of the expansion in given directions, and the circumferential measurement of the figure, in the corresponding zone.

8. A cleaner's garment sizing form comprising an upright support, an enclosing figure generally of human shape and variable in size, carried by said support, a plurality of means adjustable lengthwise of said support, engageable with the figure at zones of size variation, as the bust, waist, or hips, and by such adjustment varying the spacing of such zones, and means disposed externally of the form, and operatively engaged with the first means in all adjusted positions of the latter to expand such first means, each independently and simultaneously in substantially all radial directions, each in its own zone, but by different amounts in different radial directions, to vary the circumferential measurement of the figure in selected zones, and the amount of its expansion in each direction.

9. A cleaner's garment sizing form comprising an upright support, an enclosing figure generally of human shape and variable in size, carried by said support, a plurality of expanders disposed within the figure at zones of size variation, as the bust, waist, or hips, and each including a rotative member, a plurality of rotative indicating and control means carried by said support, adjacent the neck of the figure, a plurality of concentric tubes, each one connecting a control means with the rotative member of the corresponding expander, whereby rotation of a control means rotates the connected rotative member of the corresponding expander, to vary the measurement at its zone, in correspondence with the indicator, and means whereby each expander and its rotative member may be adjusted lengthwise of its tube, to vary the spacing of selected zones.

10. A cleaner's garment sizing form comprising an upright support, and expansive figure of generally human shape carried by said support, a plurality of expanders disposed within the figure at zones of size variation, as the bust, waist, and hips, and each including a master gear, shape-determining elements, and gearing to move the latter from the master gear, a plurality of concentric toothed tubes carried by the support, each meshing with the master gear of its corresponding expander, and terminating externally of the figure, means carried by the terminus of each tube to rotate the tube, thereby, through the corresponding master gear to effect adjustment of the shape of the figure at any given zone, and means to shift certain of said expanders lengthwise of the support and of its operating tube, to vary the spacing of such selected zones from other zones.

11. A cleaner's garment sizing form comprising an upright support, an expansive figure of generally human shape carried by said support, a plurality of expanders disposed within the figure at zones of human size variation, as the bust, waist, and hips, and each including a spider having a plurality of generally radial guides, shape-determining elements guided therein, a master gear carried by the spider, and gearing operatively connecting each master gear with the several shape-determining elements, arranged and organized to effect differential substantially radial expansion of each zone of the form, but by different amounts and in different directions in accordance with human size variations in corresponding zones, and means associated with the support to effect rotation of any selected master gear, to adjust the form in the corresponding zone.

12. A cleaner's garment sizing form comprising an upright support, an expansive figure of generally human shape carried by said support, a plurality of expanders disposed within the figure at zones of human size variation, as the bust, waist, and hips, and each including a spider having a plurality of generally radial guides, shape determining elements guided therein, a master gear carried by the spider, and gearing operatively connecting each master gear with the several shape determining elements, arranged and organized to effect differential substantially radial expansion of each zone of the form, but by different amounts and in different direction in accordance with human size variations in corresponding zones, means including concentric and rotative tubes operatively connected each to one of the master gears, to effect rotation of any such gear upon rotation of the corresponding tube, means automatically operable to lock each tube against rotation, and means formed and arranged for engagement with each tube to rotate it, and likewise formed and arranged, when so engaged, to release that tube's locking means.

13. A cleaner's garment sizing form comprising a shoulder form, a lowermost hoop, and flexible and extensible longitudinal members extending therebetween, expanders within the form and engageable with the longitudinal members to define a form of generally human shape; said longitudinal members following throughout the generally curved lines defined by said expanders, and means to adjust said expanders, each in its own plane, generally radially in substantially all directions but by different amounts in different directions, in accordance with variations in human shapes in corresponding zones.

14. A cleaner's garment sizing form comprising a shoulder form, a lowermost hoop, and flexible and extensible longitudinal members extending therebetween, expanders within the form and engageable with the longitudinal members to define a form of generally human shape, means to adjust said expanders, each in its own plane, generally radially in substantially all directions but by different amounts in different directions, in accordance with variations in human shapes in corresponding zones, and means to adjust certain of said expanders vertically, to adjust the spacing of such zones from other zones.

15. A cleaner's garment sizing form comprising a shoulder form, a lowermost hoop, and flexible and extensible longitudinal members extending therebetween, expanders within the form and engageable with the longitudinal members to define a form of generally human shape, means to adjust said expanders, each in its own plane, generally radially in substantially all directions but by different amounts in different directions, in accordance with variations in human shapes in corresponding zones, and spring means connecting adjoining longitudinal members to retain generally proportional spacing therebetween in all positions of adjustment.

16. A cleaner's garment sizing form comprising a shoulder form, a lowermost hoop, and longitudinal flexible tight coils extending therebetween, expanders within the form and engageable with the coils to press them outwardly or to draw them inwardly at appropriate zones to define a form of generally human shape, but without appreciable twisting tendency within the coils, and means to expand or contract each expander, each in such directions and amount, in each direction, to conform to variations in the human shape in a corresponding zone.

17. A cleaner's garment sizing form comprising a shoulder form, a lowermost hoop, and spring-tensioned flexible elements extending therebetween, expanders within the form and engageable with the flexible elements to press them outwardly or to draw them inwardly at appropriate zones to define a form of generally human shape, means to expand or contract each expander, each in such directions and amount, in each direction, to conform to variations in the human shape in a corresponding zone, and means to lock each expander in any adjusted position, against the opposition of the spring tension.

18. A cleaner's garment sizing form comprising a shoulder form, a hip hoop, and tight coils extending therebetween, expanders within the form and engageable with the coils to press them outwardly or to draw them inwardly at appropriate zones to define a form of generally human shape, those expanders over which the coils are convexly bent including grooved face plates, the coils lying in such grooves substantially flush with the surface of the face plate, and means to expand or contract each expander, each in such directions and amounts as will conform to variations in human size and shape in corresponding zones.

19. A cleaner's garment sizing form comprising a shoulder form, a lowermost hoop spaced therebelow farther than the distance from a human shoulder to the floor, flexible and extensible longitudinal members extending therebetween, expanders within the form at zones such as the bust, waist, and hips, and engageable with the longitudinal members to define a form of generally human shape, means to adjust said expanders, each in its own zone, in such directions and amounts as will conform to human size variations in corresponding zones, means to adjust each such expander vertically of the form as a whole, and a hem holder disposed within and adjustable vertically relative to the form, between the hip expander and the lowermost hoop, and including means to hold down the hem of a skirt or dress positioned upon said form.

20. The combination of claim 19, characterized by the formation of the hem holder with a plurality of clips projectible between the longitudinal members to the exterior of the form, and a carding tape encircling the form and received in said clips to engage the sem of the skirt.

21. The combination of claim 19, characterized by the formation of the hem holder with a plurality of clips projectible between the longitudinal members to the exterior of the form, a carding tape encircling the form and received in said clips to engage the hem of the skirt, and tape storage means carried by the hem holder, within the form.

22. A cleaner's garment sizing form comprising a shoulder form, a lowermost hoop spaced therebelow farther than the distance from a human shoulder to the floor, flexible and extensible longitudinal members extending therebetween, expanders within the form at zones such as bust, waist, and hips, and engageable with the longitudinal members to define a form of generally human shape, means to adjust said expanders, each in its own zone, in such directions and amounts as will conform to human size variations in corresponding zones, a hem holder disposed within and adjustable vertically relative to the form, between the hip expander and the lowermost hoop, and including means projectable between the longitudinal members to engage and hold down the hem of a skirt or dress positioned upon said form, a blower having a delivery nozzle directed upwardly within the form, beneath the hem holder, and a flexible sleeve within the form and connected to the hem holder at the periphery of the form, and to the nozzle, to form a conduit therebetween in all positions of adjustment of the hem holder.

23. A cleaner's garment form comprising a support and spaced elements thereon cooperating to define a form of generally human shape, means to adjust the relative positions of said elements to conform to variations in human sizes and shapes, means to discharge air within the form, means to heat the air, and timing means to control automatically and successively the discharge of unheated air and of heated air.

24. A cleaner's garment form comprising a support and spaced elements thereon cooperating to define a form of generally human shape, means to adjust the relative positions of said elements to conform to variations in human sizes and shapes, means to discharge air within the form, means to heat the air, timing means to control automatically and successively the discharge of unheated air and of heated air, means to discharge steam within the form, and means operable at will, independently of the timing means, to control the discharge of steam.

25. A cleaner's garment sizing form comprising a figure of the general shape of a human torso, defined cooperatively by a plurality of longitudinal inherently extensible and flexible elements, spaced around the figure, and supporting elements therefor spaced longitudinally, and engaged with the various longitudinal elements to flex the latter concavely and convexly, and thereby to extend them, as required to determine, by the position of the supporting elements, the contour defined by the aggregate of the longitudinal elements, and means to adjust the position of the supporting elements, and thereby to alter the contour of the figure as a whole.

26. A cleaner's garment sizing form comprising a figure of the general shape of a human torso, defined cooperatively by a plurality of longitudinal inherently extensible and flexible elements, spaced around the figure, and supporting elements therefor spaced longitudinally, and engaged with the various longitudinal elements to flex the latter concavely and convexly, and thereby to extend them, as required to determine, by the position of the supporting elements, the contour defined by the aggregate of the longitudinal elements, and means to adjust individual supporting elements, and thereby to alter the contour of the figure as a whole.

27. A cleaner's garment sizing form comprising a figure of the general shape of a human torso, defined cooperatively by a plurality of longitudinal inherently extensible and flexible elements, spaced around the figure, and supporting elements therefor spaced longitudinally, and engaged with the various longitudinal elements to flex the latter concavely and convexly, and thereby to extend them, as required to determine, by the position of the supporting elements, the contour defined by the aggregate of the longitudinal elements, and means associated with each individual supporting element, and movable to adjust the same, in directions and by amounts generally corresponding to the variations in different human figures in corresponding regions, and thereby to alter the contour of the figure as a whole.

28. A cleaner's garment sizing form comprising a figure of generally human shape defined by a plurality of longitudinal inherently extensible flexible elements, and supporting elements therefor engaged therewith at points spaced along their length, the position whereof determines the contour defined by the flexible and extensible elements, means associated with said supporting elements to adjust the same, in directions and by amounts generally corresponding to the variations in different human figures in corresponding regions, means to discharge a fluid medium within the form for treatment of a garment closely fitted thereupon, and means to control at will the characteristics of the fluid medium.

29. A cleaner's garment sizing form comprising a figure generally of human shape, and including a hip expander and a hold-down ring, below the hem of a skirt upon the figure, means to expand and contract the figure at critical zones, as the waist, hips, and hold-down ring, and means disposed between the hip expander and the hold-down ring, expansible and vertically adjustable, to engage the hem of a skirt or dress held upon the form.

30. A cleaner's garment sizing form comprising an upright support, an enclosing figure generally of human shape and variable in size, carried by said support, a plurality of expanders disposed within the figure at zones of size variation, as the bust, waist, or hips, and each including a plurality of face plates, a rotative master gear, and a plurality of pinions in mesh with the master gear and operatively connected to the face plates to move them radially, a plurality of rotative control means carried by said support, and a plurality of concentric tubes, each one connecting a control means with the rotative master gear of the corresponding expander, whereby rotation of a control means rotates the connected master gear of the corresponding expander, to vary the measurement at its zone, and means to lock each face plate in its adjusted position.

31. A cleaner's garment sizing form comprising an upright support, an expansive figure, including contractile surface-defining elements, of generally human shape carried by said support, a plurality of expanders disposed within the figure at zones of size variation, as the bust, waist, and hips, and each including a master gear, shape-determining elements, and gearing to move the latter, in opposition to the contractile elements, from the master gear; a plurality of concentric toothed tubes carried by the support, each meshing with the master gear of its corresponding expander, and terminating externally of the figure, and means carried by the terminus of each tube to rotate the tube, thereby, through the corresponding master gear and gearing to effect adjustment of the shape of the figure at any given zone, and self-locking means preventing a change in the adjustment under the influence of the contractile elements.

32. A cleaner's garment sizing form comprising an upright support, a figure generally of human shape and variable in size, carried by and enclosing said support, a plurality of means spaced longitudinally of the support, and each reacting from the support to expand the figure, in the corresponding zone, in accordance with variations of human size and shape in the respective zones, and a hem holder including means likewise guided upon the support for vertical adjustment, and reacting therefrom for expansion in all radial directions, from an inoperative position, withdrawn inside the figure, to an operative position, protruding through the figure.

33. A cleaner's garment sizing form as in claim 32 including also a carding tape extending circumferentially of the figure, and supported by said vertically adjustable hem holder means, and a magazine for storage of the carding tape, likewise supported by said hem holder means, interiorly of the figure, whereby a greater or lesser length of carding tape is disposed circumferentially of the figure, as its expansion may require.

WALLMUTH R. FRENTZEL.